US012363519B2

(12) United States Patent
Cheong et al.

(10) Patent No.: US 12,363,519 B2
(45) Date of Patent: Jul. 15, 2025

(54) APPARATUS AND METHOD FOR ESTABLISHING A CONNECTION

(71) Applicant: SAMSUNG ELECTRONICS CO., LTD., Suwon-si (KR)

(72) Inventors: Gupil Cheong, Suwon-si (KR); Hyeonggeun Kim, Suwon-si (KR); Kyungik Jang, Suwon-si (KR); Doosuk Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 405 days.

(21) Appl. No.: 17/874,013

(22) Filed: Jul. 26, 2022

(65) Prior Publication Data

US 2023/0050948 A1 Feb. 16, 2023

Related U.S. Application Data

(63) Continuation of application No. PCT/KR2022/008734, filed on Jun. 21, 2022.

(30) Foreign Application Priority Data

Aug. 6, 2021 (KR) .......................... 10-2021-0103785

(51) Int. Cl.
*H04W 4/80* (2018.01)
*H04W 76/14* (2018.01)

(52) U.S. Cl.
CPC .............. *H04W 4/80* (2018.02); *H04W 76/14* (2018.02)

(58) Field of Classification Search
CPC ........... H04W 4/80; H04W 4/00; H04W 4/70; H04W 76/14; H04W 76/15; H04W 76/36;
(Continued)

(56) References Cited

U.S. PATENT DOCUMENTS 8,879,993 B2 * 11/2014 Palin .................... G01S 5/0072
455/41.2
9,641,622 B2 * 5/2017 Kapoor .................... H04R 3/12
(Continued)

FOREIGN PATENT DOCUMENTS

CN 109743654 A 5/2019
CN 209731578 U 12/2019
(Continued)

OTHER PUBLICATIONS

International Search Report (PCT/ISA/210), dated Sep. 21, 2022, issued by the International Searching Authority, Application No. PCT/KR2022/008734.
(Continued)

*Primary Examiner* — Man U Phan
(74) *Attorney, Agent, or Firm* — Sughrue Mion, PLLC

(57) ABSTRACT

The first electronic device for establishing a connection includes at least one sensor, a first communication interface, a second communication interface, and at least one processor being configured to obtain first location information of the first electronic device through the at least one sensor, obtain second location information of the second electronic device from the external electronic device or the second electronic device, determine connection operation information indicating at least one operation to be performed to establish a communication link with the second electronic device and at least one parameter to be used for the at least one operation, and establish the communication link with the second electronic device.

20 Claims, 17 Drawing Sheets

(58) Field of Classification Search
CPC ....... H04W 4/50; H04W 40/24; H04W 48/08;
H04W 48/16; H04W 72/04; H04W 72/30;
H04W 72/56; H04W 76/02; H04W 84/04;
H04W 84/18; H04L 1/16; H04L 1/18;
H04L 1/00; H04L 5/00; H04L 25/02;
H04L 61/50; H04L 69/14; H04L 69/22;
H04L 9/40; H04R 5/02; H04R 5/04;
H04R 3/12; H04R 1/10; G06F 3/16;
G06F 3/12; G06F 3/01
USPC .......................................................... 370/329
See application file for complete search history.

(56) References Cited

U.S. PATENT DOCUMENTS

| | | | | |
|---|---|---|---|---|
| 10,117,012 | B2* | 10/2018 | Saulsbury | H04R 1/1041 |
| 10,291,975 | B2* | 5/2019 | Howell | H04R 1/1041 |
| 10,499,154 | B2* | 12/2019 | Watson | H04R 5/02 |
| 10,554,800 | B2* | 2/2020 | Watson | H04R 3/12 |
| 10,631,363 | B1* | 4/2020 | Xian | H04M 1/6066 |
| 11,095,967 | B2* | 8/2021 | Watson | H04R 1/1041 |
| 11,405,120 | B2* | 8/2022 | Bonde | H04J 3/0632 |
| 11,778,427 | B2* | 10/2023 | Chen | H04W 4/10 455/518 |
| 2012/0063327 | A1 | 3/2012 | Sakai | |
| 2014/0111307 | A1 | 4/2014 | Ingrassia, Jr. et al. | |
| 2017/0303090 | A1* | 10/2017 | Stitt | H04W 12/06 |
| 2018/0317174 | A1 | 11/2018 | Chaubey et al. | |
| 2019/0052984 | A1 | 2/2019 | Hariharan et al. | |
| 2019/0141459 | A1 | 5/2019 | El-Hoiydi | |
| 2019/0281437 | A1 | 9/2019 | Watson et al. | |
| 2019/0289381 | A1 | 9/2019 | Chawan et al. | |
| 2020/0052526 | A1 | 2/2020 | Ueda | |
| 2020/0288518 | A1 | 9/2020 | Pavlov et al. | |
| 2021/0120608 | A1 | 4/2021 | Gong et al. | |
| 2022/0039179 | A1 | 2/2022 | Chen et al. | |
| 2022/0070642 | A1* | 3/2022 | Kontopidis | H04W 76/10 |
| 2022/0078584 | A1* | 3/2022 | Chen | H04L 61/50 |
| 2022/0369394 | A1 | 11/2022 | Ni et al. | |

FOREIGN PATENT DOCUMENTS

| | | |
|---|---|---|
| CN | 110677807 A | 1/2020 |
| CN | 110809243 A | 2/2020 |
| CN | 111464993 A | 7/2020 |
| CN | 113015077 A | 6/2021 |
| CN | 108834052 B | 3/2022 |
| CN | 113068114 B | 1/2023 |
| WO | 2020/107485 A1 | 6/2020 |
| WO | 2021/033894 A1 | 2/2021 |
| WO | 2021/043219 A1 | 3/2021 |

OTHER PUBLICATIONS

Written Opinion (PCT/ISA/237), dated Sep. 21, 2022, issued by the International Searching Authority, Application No. PCT/KR2022/008734.

Communication issued Jul. 3, 2024 by the European patent Office in European Patent Application No. 22853258.6.

Communication issued Oct. 28, 2024 by the European Patent Office in European Patent Application No. 22853258.6.

* cited by examiner

APPARATUS AND METHOD FOR ESTABLISHING A CONNECTION

CROSS-REFERENCE TO RELATED APPLICATIONS

This application is a continuation of International Application No. PCT/KR2022/008734, designating the United States, filed on Jun. 21, 2022, in the Korean Intellectual Property Office, which claims priority to Korean Patent Application No. 10-2021-0103785, filed on Aug. 6, 2021, in the Korean Intellectual Property Office, the disclosures of which are incorporated by reference herein in their entireties.

BACKGROUND

1. Field

The present disclosure relates generally to wireless communications, and more particularly, to an apparatus and a method for establishing a connection.

2. Description of Related Art

Bluetooth communication technology may provide a short-range wireless communication technique that enables electronic devices to be connected to each other for exchanging data or information. Bluetooth communication technology may include Bluetooth legacy (or classic) communication technology or Bluetooth low-energy (BLE) communication technology, and may have topology in the form of various connections such as a piconet and/or a scatternet.

Recently, electronic devices using Bluetooth communication technology have been widely used. In particular, a pair of earphones that may be worn on both ears of a user are widely used as an ear-wearable device.

An ear-wearable device may provide various functions. For example, the ear-wearable device may include a microphone to identify a user's voice and to transmit data on the user's voice to an electronic device (e.g., a smartphone) according thereto. In addition, the ear-wearable device may include a speaker to output audio data received from an electronic device (e.g., a smartphone).

The ear-wearable device may include a master earbud device capable of being connected to an electronic device (e.g., a smartphone), and a slave earbud device. The master earbud device may transmit voice data to an electronic device through a connection with the electronic device, and the electronic device may transmit audio data (and/or audio content) to the master earbud device. The master earbud device may transmit the audio data (and/or audio content) received from the electronic device through wireless communication to the slave earbud device, and may output the audio data together with the slave earbud device through a speaker.

The master earbud device and the slave earbud device (hereinafter referred to as "earbud devices") may be connected to each other, based on Bluetooth communication, in order to perform the above operations. To this end, the earbud devices may perform a page operation and/or a page scan operation, or a BLE advertising and/or a BLE scan operation.

The page operation may indicate an initial operation of a connection procedure in which a page message is transmitted until a response is received from a target device or a time-out occurs. The page scan operation may indicate an operation for monitoring reception of a page message in a page scan physical channel.

The BLE advertising may indicate an operation of periodically broadcasting an advertising packet in an advertising physical channel, and the BLE scan operation may indicate an operation for monitoring reception of an advertising packet.

The page operation and/or page scan operation, or the BLE advertising and/or BLE scan operation may be performed after a booting operation (e.g., a power-on sequence) of the earbud devices is completed and a Bluetooth function is enabled. For example, in the case where the earbud devices are true wireless stereo (TWS) type devices, the booting operation of the earbud devices may be performed when a cradle switches from a closed state into an open state while the earbud devices are located inside the cradle.

When the Bluetooth function is enabled according to a completion of the booting operation of the earbud devices, the earbud devices may simultaneously (e.g., within a short time period) perform a page operation and/or a page scan operation to establish a connection based on Bluetooth communication, or simultaneously (e.g., within a short time period) perform a BLE advertising operation and/or a BLE scan operation, or perform only a configured operation (e.g., one of the page operation and/or the page scan operation, or one of the BLE advertising and/or the BLE scan operation).

The earbud devices may be unable to recognize the enabled state of a Bluetooth function and/or location information of a counterpart device before establishing a connection, based on Bluetooth communication, with the counterpart device. Accordingly, the earbud devices may be unable to decide whether to use a significant amount of electrical current and/or resources to establish a quick connection (e.g., legacy Bluetooth) or whether to choose to establish a slow connection (e.g., BLE) that may incur a reduced amount of electrical current usage and/or resources.

As a result, the earbud devices may prepare and/or attempt a single type of Bluetooth (e.g., legacy or BLE) connection regardless of the operational scenario. As such, it may be difficult to perform or establish an optimized connection in consideration of the enabled state of a Bluetooth function and/or location information of a counterpart device. Therefore, the earbud devices may not utilize resources in an efficient manner, which may result in excessive power consumption and/or decreased connection speeds (e.g., bandwidth and/or throughput) when performing a connection operation.

SUMMARY

According to one embodiment, an apparatus and a method for establishing a connection may be provided.

According to one embodiment, provided are an apparatus and a method capable of rapidly performing a connection using Bluetooth communication, based on location information of electronic devices.

According to one embodiment, provided are an apparatus and a method capable of increasing a connection speed between electronic devices and minimizing waste of resources used for connection.

According to an aspect of the disclosure, there is provided a first electronic device for establishing a connection that includes at least one sensor, a first communication interface configured to perform first communications with an external electronic device, a second communication interface configured to perform second communications with a second electronic device, and at least one processor operably connected to the at least one sensor, the first communication interface, and the second communication interface. The at least one processor is configured to obtain first location information of the first electronic device through the at least one sensor. The at least one processor is further configured to obtain location second information of the second electronic device from the external electronic device or the second electronic device. The at least one processor is further configured to determine connection operation information indicating at least one operation to be performed by the first electronic device to establish a communication link with the second electronic device and at least one parameter to be used for the at least one operation, based on the first location information and the second location information. The at least one processor is further configured to establish the communication link with the second electronic device, based on the connection operation information and the at least one parameter.

According to an aspect of the disclosure, there is provided an electronic device for establishing a connection that includes at least one sensor, a communication interface configured to perform communications with a first external electronic device or a second external electronic device, and at least one processor operably connected to the at least one sensor and the communication interface. The at least one processor is configured to identify whether the first external electronic device or the second external electronic device is mounted to the electronic device through the at least one sensor to obtain an identification result. The at least one processor is further configured to identify first location information of the first external electronic device or second location information of the second external electronic device, based on the identification result. The at least one processor is further configured to transmit the second location information to the first external electronic device, based on a first request from the first external electronic device. The at least one processor is further configured to transmit the first location information to the second external electronic device, based on a second request from the second external electronic device. The first location information and the second location information are configured to be used to determine connection operation information indicating at least one operation to be performed by each of the first external electronic device and the second external electronic device to establish a communication link and at least one parameter to be used for the at least one operation.

According to an aspect of the disclosure, there is provided a method for establishing a connection by a first electronic device that includes obtaining first location information of the first electronic device through at least one sensor of the first electronic device. The method further includes obtaining second location information of a second electronic device from an external electronic device or the second electronic device. The method further includes determining connection operation information indicating at least one operation to be performed by the first electronic device to establish a communication link with the second electronic device and at least one parameter to be used for the at least one operation, based on the first location information and the second location information. The method further includes establishing the communication link with the second electronic device, based on the connection operation information and the at least one parameter.

According to an aspect of the disclosure, there is provided a method for establishing a connection by an electronic device that includes identifying whether a first external electronic device or a second external electronic device is mounted to the electronic device to obtain an identification result. The method further includes identifying first location information of the first external electronic device or second location information of the second external electronic device, based on the identification result. The method further includes transmitting the second location information to the first external electronic device, based on a first request from the first external electronic device. The method further includes transmitting the first location information to the second external electronic device, based on a second request from the second external electronic device. The first location information and the second location information are configured to be used to determine connection operation information indicating at least one operation to be performed by each of the first external electronic device and the second external electronic device to establish a communication link and at least one parameter to be used for the at least one operation.

In one embodiment, two or more electronic devices may efficiently establish a connection.

In one embodiment, an operation for establishing a connection may be determined based on location information of electronic devices.

In one embodiment, improvements to a connection speed between electronic devices and/or a reduction of wasted resources used for the connection may be effected.

DETAILED DESCRIPTION

Figure 1:
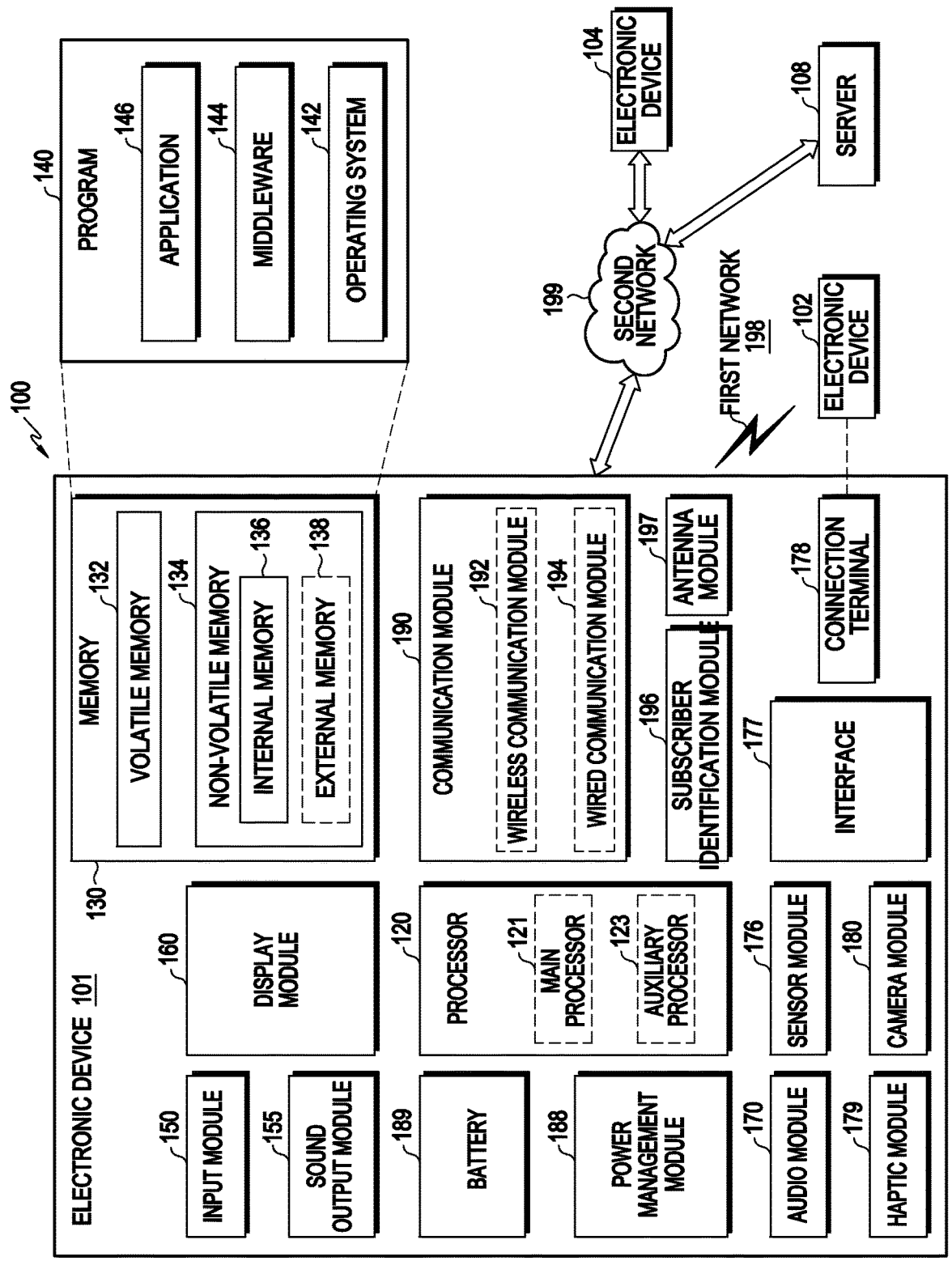
FIG. 1 is a block diagram illustrating an electronic device in a network environment according to one embodiment.

Hereinafter, embodiments of the present disclosure will be described in detail with reference to the accompanying drawings. And, in describing embodiments of the present disclosure, if it is determined that a detailed description of a related well-known function or configuration may unnecessarily obscure the gist of embodiments of the present disclosure, the detailed description will be omitted. And the terms to be described later are terms defined in consideration of functions in embodiments of the present disclosure, which may vary according to intentions or customs of users and operators. Therefore, the definition should be made based on the content throughout this specification.

It should be noted that the technical terms used in this specification are only used to describe specific embodiments, and are not intended to limit embodiments of the present disclosure. Alternatively, the technical terms used in this specification should be construed as meanings generally understood by those of ordinary skill in the art to which the present disclosure pertains, unless otherwise specifically defined in the present specification, and are overly inclusive. It should not be construed in the meaning of a human being or in an excessively reduced meaning. Alternatively, when the technical terms used in the present specification are incorrect technical terms that do not accurately express the spirit of the present disclosure, they should be understood by being replaced with technical terms that can be correctly understood by those skilled in the art. Alternatively, general terms used in embodiments of the present disclosure should be interpreted as defined in advance or in context of context, and should not be interpreted in an excessively reduced meaning.

Alternatively, the singular expression used herein includes the plural expression unless the context clearly dictates otherwise. In the present application, a term such as "consisting of" or "comprising" should not be construed as necessarily including all of the components or operations described in the specification, some of which components or some operations are It should be construed that it may not include, or may further include additional components or operations.

Alternatively, terms including ordinal numbers such as first and second used herein may be used to describe elements, but the elements should not be limited by the terms. The above terms are used only for the purpose of distinguishing one component from another. For example, without departing from the scope of the present disclosure, a first component may be referred to as a second component, and similarly, the second component may also be referred to as a first component.

When a component is referred to as being "connected" or "connected" to another component, it may be directly connected or connected to the other component, but another component may exist in between. On the other hand, when it is said that a certain element is "directly connected" or "directly connected" to another element, it should be understood that no other element is present in the middle.

Hereinafter, embodiments according to the present disclosure will be described in detail with reference to the accompanying drawings, but the same or similar components are assigned the same reference numerals regardless of reference numerals, and redundant description thereof will be omitted. Alternatively, in describing embodiments of the present disclosure, if it is determined that a detailed description of a related known technology may obscure the subject matter of the present disclosure, the detailed description thereof will be omitted. Alternatively, it should be noted that the accompanying drawings are only for easy understanding of the spirit of the present disclosure, and should not be construed as limiting the spirit of the present disclosure by the accompanying drawings. It should be construed as extending the spirit of the present disclosure to all modifications, equivalents and substitutes other than the accompanying drawings.

Hereinafter, a terminal will be described in embodiments of the present disclosure, but the terminal may be referred to as an electronic device, a mobile station, a mobile equipment (ME), and a user equipment (UE), a user terminal (UT), a subscriber station (SS), a wireless device, a handheld device, or an access terminal (AT). Alternatively, in embodiments of the present disclosure, the terminal is, for example, a mobile phone, a personal digital assistant (PDA), a smart phone, a wireless modem, a device having a communication function, such as a notebook computer.

Alternatively, in describing embodiments of the present disclosure in detail, reference will be made to Bluetooth wireless communication technology, but the main subject matter of the present disclosure does not significantly depart from the scope of the present disclosure in other communication systems having a similar technical background. It can be applied with a few modifications in the range not specified, which will be possible at the judgment of a person skilled in the art in the technical field of the present disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to one embodiment, a method and an apparatus for establishing a connection may be provided.

According to one embodiment, connection establishment may be performed between a plurality of electronic devices. A plurality of electronic devices may be electronic devices that can be connected to each other to perform the same operation (e.g., outputting sound) and that require an external electronic device such as a cradle because they cannot perform operations of powering on, powering off, and/or charging by themselves.

Embodiments are described below based on the case in which a plurality of electronic devices are two electronic devices (i.e., a first electronic device and a second electronic device). However, the number of electronic devices is not limited to two, and embodiments may be applied to three or more connectable electronic devices.

In one embodiment, each of the first electronic device and the second electronic device may be configured in a physically independent form and may be an ear-wearable device or earbud in the form of an earphone capable of being worn on the ear of a user. The first electronic device and the second electronic device may be true wireless stereo (TWS) type devices and may operate as a single electronic device by being connected through a short-range wireless communication technology (e.g., Bluetooth legacy (or classic) communication technology or Bluetooth low-energy (BLE) communication technology).

According to one embodiment, the external electronic device may be used as a mounting for at least one of charging, powering on, an powering off the first electronic device and the second electronic device. For example, the external electronic device may be a cradle or a charging case and include a cover capable of being opened or closed by a user or a sensor.

According to one embodiment, the first electronic device and the second electronic device may share and identify their location information at the time at which the first electronic device and the second electronic device are mounted to the external electronic device or at which the cover of the external electronic device is opened or closed. The location information shared between the first electronic device and the second electronic device may be used for an operation of preparing a connection between the first electronic device and the second electronic device (e.g., a page operation and/or a page scan operation).

According to one embodiment, the first electronic device and the second electronic device may share their location information with each other through a wireless communication scheme or share their location information with each other through the external electronic device. Each of the first electronic device and the second electronic device may obtain location information from the external electronic device through a wireless communication scheme or a wired communication scheme. The first electronic device and the second electronic device may determine information (hereinafter referred to as "connection operation information") about at least one operation to be performed for communication establishment (or communication link establishment) and at least one parameter, based on their location information.

In one embodiment, connection operation information may include information indicating at least one of an operation of requesting a connection (e.g., a page operation) or an operation of accepting a connection request (e.g., a page scan operation). The connection operation information may indicate a pre-operation for a connection, which may be referred to as a connection establishment substrate role.

Hereinafter, the first electronic device, the second electronic device, and the external electronic device are described in more detail with reference to FIGS. 2A and 2B.

Figure 2A:
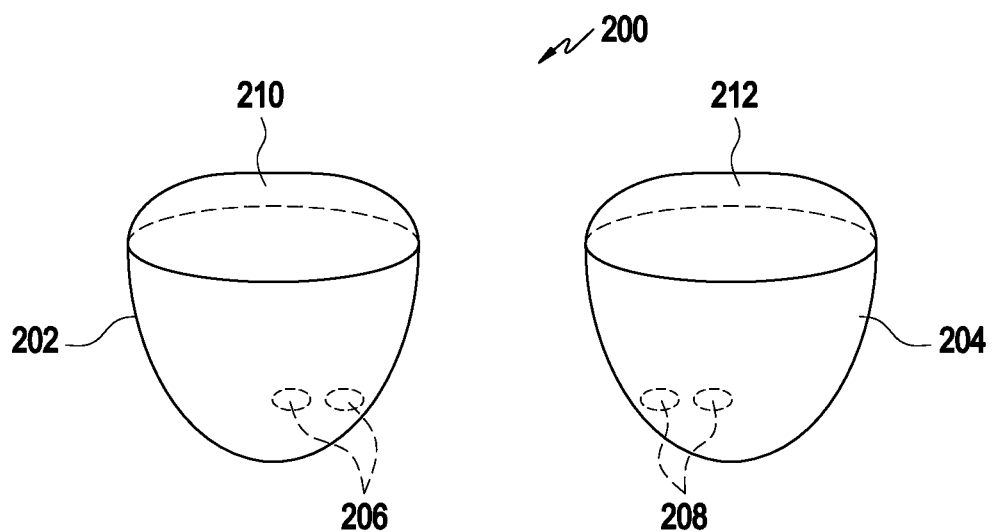
FIG. 2A is a diagram schematically illustrating a first electronic device and a second electronic device according to one embodiment.

FIG. 2A is a diagram 200 schematically illustrating a first electronic device 202 and a second electronic device 204 according to one embodiment.

Referring to FIG. 2A, the first electronic device 202 and the second electronic device 204 may be TWS type ear-wearable devices (e.g., earbuds) and may be connected through short-range wireless communication technology (e.g., Bluetooth or BLE). The first electronic device 202 and the second electronic device 204 may be the external electronic device 102 in FIG. 1 or the external electronic device 104 in FIG. 1, respectively.

In an embodiment, the first electronic device 202 and the second electronic device 204 may include a first charging port 206 and a second charging port 208, respectively. Each of the first charging port 206 and the second charging port 208 may be connected to a charging port of the external electronic device (e.g., external electronic device 220 of FIG. 3) that may be used to supply charging power to the first electronic device 202 and the second electronic device 204, respectively. For example, the charging power may recharge and/or replenish a corresponding power storage device (e.g., battery, not shown) of the first electronic device 202 and the second electronic device 204. The connection between each of the first charging port 206 and the second charging port 208 and the charging port of the external electronic device 220 may be made in a contact manner.

In an embodiment, the first charging port 206 and the second charging port 208 may be used to identify whether or not the first electronic device 202 and the second electronic device 204 are mounted to the external electronic device 220, respectively. For example, if the first charging port 206 is connected to the charging port of the external electronic device 220, the first electronic device 202 may be identified as being mounted to the external electronic device 220. If the first charging port 206 is not connected to the charging port of the external electronic device 220, the first electronic device 202 may be identified as not being mounted to the external electronic device 220. Similarly, if the second charging port 208 is connected to the charging port of the external electronic device 220, the second electronic device 204 may be identified as being mounted to the external electronic device 220. If the second charging port 208 is not connected to the charging port of the external electronic device 220, the second electronic device 204 may be identified as not being mounted to the external electronic device 220.

According to an embodiment, the first electronic device 202 and the second electronic device 204 may receive power from the external electronic device 220 through wireless charging. In this case, the first electronic device 202 and the second electronic device 204 may not use or may not include the first charging port 206 and the second charging port 208, respectively. If wireless charging is used, the first electronic device 202 and the second electronic device 204 may include a sensor for determining whether or not the first electronic device 202 and the second electronic device 204 are mounted, instead of the first charging port 206 and the second charging port 208.

According to an embodiment, whether or not the first electronic device 202 and the second electronic device 204 are mounted may be determined based on whether or not the magnitude of power (e.g., the magnitude of power detected from a wireless charging circuit included in each of the first electronic device 202 and the second electronic device 204) provided from the external electronic device 220 to each of the first electronic device 202 and the second electronic device 204 is equal to or greater than a threshold value. For example, if the magnitude of power provided from the external electronic device 220 to the first electronic device 202 or the second electronic device 204 is determined to be equal to or greater than the threshold value, it may be determined that the first electronic device 202 or the second electronic device 204 has been mounted to the external electronic device 220. If the magnitude of power provided from the external electronic device 220 to the first electronic device 202 or the second electronic device 204 is determined to be less than the threshold value, it may be determined that the first electronic device 202 or the second electronic device 204 has not been mounted to the external electronic device 220.

In an embodiment, the first electronic device 202 and the second electronic device 204 may respectively include a first sensor 210 and a second sensor 212. According to an embodiment, the first sensor 210 and the second sensor 212 may be disposed on top of the first electronic device 202 and the second electronic device 204, respectively. The first sensor 210 and the second sensor 212 may be used to determine whether or not a cover 203 of the external electronic device 220 is in an open state or a closed state.

In an embodiment, in the case where each of the first sensor 210 and the second sensor 212 is a magnetic sensor (e.g., a Hall sensor), it may be determined whether a cover 203 of the external electronic device 220 is in an open state or a closed state, based on whether or not a magnetic force detected by the first sensor 210 and/or the second sensor 212 is equal to or greater than a threshold value. Each of the first sensor 210 and the second sensor 212 may detect a magnetic force from a magnetic material included in the cover 203 of the external electronic device 220.

In an embodiment, if the magnetic force detected by the first sensor 210 and/or the second sensor 212 is equal to or greater than the threshold value, the cover 203 of the external electronic device 220 may be identified as being in the closed state, and if the magnetic force detected by the first sensor 210 and/or the second sensor 212 is less than the threshold value, the cover 203 of the external electronic device 220 may be identified as being in the open state.

In an embodiment, in the case where each of the first sensor 210 and the second sensor 212 is a light sensing sensor (or an illuminance sensor), it may be determined whether the cover 203 of the external electronic device 220 is in an open state or a closed state, based on whether or not the amount of light detected by the first sensor 210 and/or the second sensor 212 is equal to or greater than a threshold value.

In an embodiment, if the amount of light detected by the first sensor 210 and/or the second sensor 212 is equal to or greater than the threshold value, the cover 203 of the external electronic device 220 may be identified as being in the open state, and if the amount of light detected by the first sensor 210 and/or the second sensor 212 is less than the threshold value, the cover 203 of the external electronic device 220 may be identified as being in the closed state.

Figure 2B:
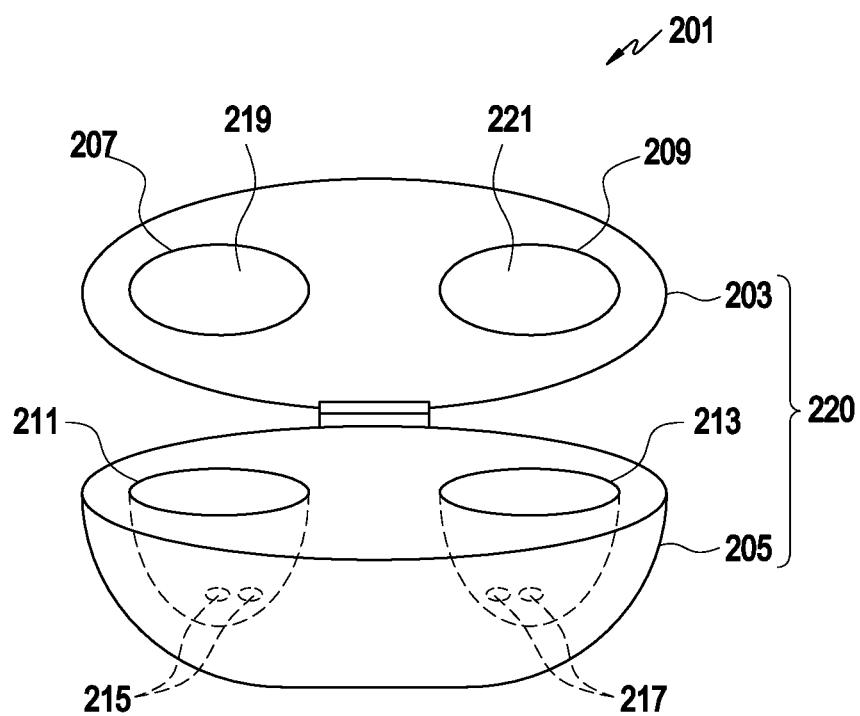
FIG. 2B is a diagram schematically illustrating an external electronic device according to one embodiment.

FIG. 2B is a diagram 201 schematically illustrating an external electronic device 220 according to one embodiment.

Referring to FIG. 2B, the external electronic device 220 may be used to store and/or charge the first electronic device 202 and the second electronic device 204 and may include a cover 203 and a body 205. The body 205 of the external electronic device 220 may include a first mounting part 211 and a second mounting part 213 to which the first electronic device 202 and the second electronic device 204 shown in FIG. 2A are able to be mounted, respectively.

The first mounting part 211 and the second mounting part 213 may include a third charging port 215 and a fourth charging port 217, respectively. The third charging port 215 and the fourth charging port 217 may come into contact with the first charging port 206 of the first electronic device 202 and the second charging port 208 of the second electronic device 204, respectively.

Although not shown in FIG. 2B, the external electronic device 220 may include a power supply circuit and provide power supplied from the outside through a USB port or a wireless charging circuit or power of a battery mounted to the external electronic device 220 to the first electronic device 202 and the second electronic device 204 through the third charging port 215 and the fourth charging port 217. The first electronic device 202 and the second electronic device 204 may receive the power, provided through the third charging port 215 and the fourth charging port 217, using the first charging port 206 and the second charging port 208.

The cover 203 of the external electronic device 220 may be opened or closed according to various intentions of the user. For example, the cover 203 may be opened according to the intentions of the user to take out the first electronic device 202 and/or the second electronic device 204 located inside the external electronic device 220 to use a Bluetooth service, or the intentions of the user to charge or store the first electronic device 202 and/or the second electronic device 204. In addition, the cover 203 may be closed according to the intentions of the user to stop the usage of a Bluetooth service through the first electronic device 202 and/or the second electronic device 204, or the intentions of the user to charge or store the first electronic device 202 and/or the second electronic device 204 through the external electronic device 220.

A first hole 207 and a second hole 209 that respectively come into contact with the first mounting part 211 and the second mounting part 213 of the body 205 in the closed state may be provided in the cover 203 of the external electronic device 220. In an embodiment, the first hole 207 and the second hole 209 may include magnetic materials (e.g., magnets or electromagnets) 219 and 221 for detecting the magnetic force of the external sensors (e.g., the first sensor 210 of the first electronic device 202 or the second sensor 212 of the second electronic device 204), respectively.

In another embodiment, the first hole 207 and the second hole 209 may include sensors (e.g., magnetic sensors, not shown) for identifying the open or closed state of the cover 203, respectively. In this case, the external electronic device 220 may provide information indicating that the cover 203 is in the open or closed state to the first electronic device 202 or the second electronic device 204, based on the information identified by the sensor. The information indicating that the cover 203 is in the open or closed state may be provided to the first electronic device 202 or the second electronic device 204 in response to a request from the first electronic device 202 or the second electronic device 204.

In an embodiment, the external electronic device 220 may perform communication with the first electronic device 202 or the second electronic device 204, based on a wired communication scheme using LAN or PLC, or a wireless communication scheme using Bluetooth or BLE communication technology. Accordingly, the external electronic device 220 may further include a communication interface for wired communication or wireless communication.

Figure 3:
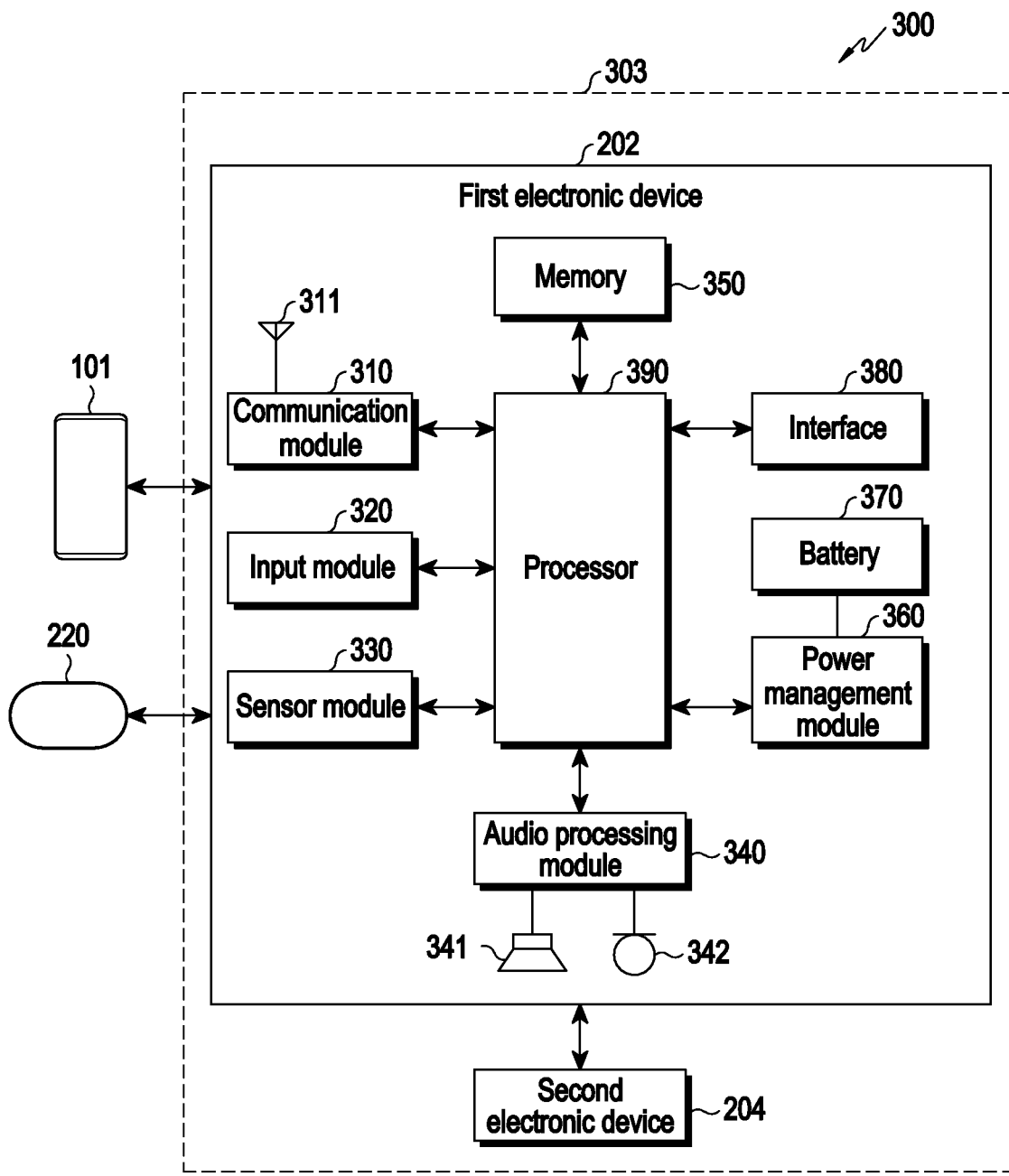
FIG. 3 is a block diagram illustrating the configuration of an ear-wearable device according to one embodiment.

FIG. 3 is a block diagram 300 illustrating the configuration of an ear-wearable device 303 according to one embodiment.

Referring to FIG. 3, the ear-wearable device 303 may include a first electronic device 202 and a second electronic device 204. In an embodiment, the first electronic device 202 may be a master earbud device connectable to the electronic device 101 (e.g., a smartphone) shown in FIG. 1, and the second electronic device 204 may be a slave earbud device connectable to the master earbud device.

The first electronic device 202 may include the same or similar elements to at least one of the elements (e.g., the modules) of the electronic device 101 shown in FIG. 1. The first electronic device 202 may include an antenna module 311 (e.g., the antenna module 197 in FIG. 1), a communication module 310 (e.g., the communication module 190 in FIG. 1), an input module 320 (e.g., the input module 150 in FIG. 1), a sensor module 330 (e.g., the sensor module 176 in FIG. 1), an audio processing module 340 (e.g., the audio module 170 in FIG. 1), a memory 350 (e.g., the memory 130 in FIG. 1), a power management module 360 (e.g., the power management module 188 in FIG. 1), a battery 370 (e.g., the battery 189 in FIG. 1), an interface 380 (e.g., the interface 177 in FIG. 1), and a processor 390 (e.g., the processor 120 in FIG. 1).

According to an embodiment, the communication module 310 may include at least one of a wireless communication module (e.g., a Bluetooth communication module, a cellular communication module, a Wi-Fi communication module, a near-field communication (NFC) communication module, or a GNSS communication module) and a wired communication module (e.g., a LAN communication module or a PLC communication module). In an embodiment, the communication module 310 may also be referred to as a communication interface.

The communication module 310 may communicate directly or indirectly with at least one of the electronic device 101 (e.g., a smartphone), the external electronic device 220 (e.g., a charging device such as a cradle), or the second electronic device 204 (e.g., a slave earbud device) through a first network (e.g., the first network 198 in FIG. 1) using at least one communicate module included therein. The second electronic device 204 may be an element of the ear-wearable device 303, which is paired with the first electronic device 202. The communication module 310 may operate independently of the processor 390 and include one or more communication processors supporting wired or wireless communication.

According to one embodiment, the antenna module 311 may transmit a signal or information to another electronic device (e.g., at least one of the electronic device 101, the external electronic device 220, or the second electronic device 204) or receive the same from another electronic device. According to an embodiment, the antenna module 311 may include a plurality of antennas. According to an embodiment, at least one antenna suitable for the communication scheme used in the communication network such as a first network (e.g., the first network 198 in FIG. 1) or a second network (e.g., the second network 199 in FIG. 2) may be selected from the plurality of antennas by the communication module 310. Signals or information may be transmitted or received between the communication module 310 and another electronic device through the at least one selected antenna.

According to one embodiment, the input module 320 may be configured to produce various input signals that are to be used for the operation of the first electronic device 202. The input module 320 may include a touch pad, a touch panel, or buttons. The touch pad may recognize a touch input by, for example, at least one of a capacitive type, a pressure-sensitive type, an infrared type, or an ultrasonic type. In the case where a capacitive touch pad is provided, physical contact or proximity recognition may be possible. The touch pad may further include a tactile layer. The touch pad including the tactile layer may provide a tactile response to the user. The buttons may include, for example, physical buttons or optical keys.

According to an embodiment, the input module 320 may produce a user input related to turning on or off the first electronic device 202. According to an embodiment, the input module 320 may receive a user input for a communication connection between the first electronic device 202 and the second electronic device 204. According to an embodiment, the input module 320 may receive a user input related to audio data (or audio content). For example, the user input may relate to functions of starting playback, pausing playback, stopping playback, adjusting playback speed, adjusting playback volume, or muting of audio data. The operation of the first electronic device 202 may be controlled by various gestures such as tapping the surface on which the touch pad is mounted or swiping up and down the same.

According to an embodiment, the sensor module 330 may identify the location or operation state of the first electronic device 202 or identify whether the cover 203 of the external electronic device 220 is in an open state or closed state. The sensor module 330 may convert measured or identified information into an electrical signal. The sensor module 330 may include, for example, at least one of a magnetic sensor, an acceleration sensor, a gyro sensor, a geomagnetic sensor, a proximity sensor, a gesture sensor, a grip sensor, a biometric sensor, or an optical sensor. In an embodiment, the optical sensor may include a light-emitting unit (e.g., a light-emitting diode (LED)) that emits light in at least one wavelength band. The optical sensor may include a light-receiving unit (e.g., a photodiode) that receives light in one or more wavelength bands scattered or reflected from an object and generates an electrical signal. In an embodiment, the sensor module 330 may further include a location sensing sensor. The location sensing sensor may identify whether the first electronic device 202 is located inside or outside the external electronic device 220, based on whether or not a charging port (e.g., the first charging port 206) of the first electronic device 202 and a charging port (e.g., the third charging port 215 or the fourth charging port 217) of the external electronic device 220 come into contact with each other.

According to an embodiment, the audio processing module 340 may support an audio data collection function and reproduce collected audio data. According to an embodiment, the audio processing module 340 may include an audio decoder (not shown) and a D/A converter (not shown). The audio decoder may convert audio data stored in the memory 350 or received from the electronic device 101 through the communication module 310 into a digital audio signal. The D/A converter may convert a digital audio signal converted by the audio decoder into an analog audio signal. According to an embodiment, the audio decoder may convert audio data received from the electronic device 101 through the communication module 310 and stored in the memory 350 into a digital audio signal. The speaker 341 may output an analog audio signal converted by the D/A converter. According to an embodiment, the audio processing module 340 may include an A/D converter (not shown). The A/D converter may convert an analog voice signal transmitted through a microphone 342 into a digital voice signal.

According to an embodiment, the microphone 342 may include at least one air conduction microphone and/or at least one bone conduction microphone for detecting voices. The air conduction microphone may detect a voice (e.g., a user's utterance) transmitted through air and output a voice signal corresponding to the detected voice. The bone conduction microphone may measure vibration of a user's bone (e.g., skull) due to the user's utterance and output a voice signal corresponding to the measured vibration. The bone conduction microphone may also be referred to as a bone conduction sensor or various other names. The voice detected by the air conduction microphone may be a voice mixed with external noise while the user's utterance is transmitted through the air, whereas the voice detected by the bone conduction microphone may be detected from the vibration of the bone, thereby reducing inflow of external noise (e.g., the effect of noise). Accordingly, the bone conduction microphone may output a voice signal corresponding to a user's voice with reduced external noise even in a high-noise environment. According to an embodiment, the voice signal output from the microphone 342 may be transmitted to the processor 390. According to an embodiment, an acceleration sensor (e.g., the sensor module 330) may be used to obtain a voice signal corresponding to a user's voice with reduced external noise. For example, the acceleration sensor may measure vibration of a user's skin due to the user's utterance and output a voice signal corresponding to the measured vibration to the processor 390. Since the voice (e.g., vibration) detected by the acceleration sensor is detected from the vibration of the skin, inflow of external noise (e.g., the influence of noise) may be reduced. The bone conduction microphone and/or acceleration sensor described above may be referred to as a voice pickup unit (VPU) and may be referred to as various other names.

According to one embodiment, the audio processing module 340 may reproduce various audio data configured in the operation of the first electronic device 202. For example, the processor 390 may be designed to detect that the first electronic device 202 is may be designed to worn on or removed from a user's ear through the sensor module 330 and to reproduce audio data related to effect sounds or guide sounds through the audio processing module 340. The output of the sound effects or the guide sounds may be omitted according to a user setting or the intentions of a designer.

According to one embodiment, the memory 350 may store a variety of data used by at least one element (e.g., the processor 390 or the sensor module 330) of the first electronic device 202. Data may include, for example, software and input data or output data for instructions related thereto. According to an embodiment, the data may include audio data received from the electronic device 101, cover state information (e.g., an open state or a closed state) of the external electronic device 220, location information of the second electronic device 202 received from the external electronic device 220 or the second electronic device 202, or connection operation information required for connection with the second electronic device 202 and information on at least one parameter. The memory 350 may include a volatile memory or a nonvolatile memory.

According to one embodiment, the power management module 360 may manage power supplied to the first electronic device 202. According to an embodiment, the power management module 360 may be implemented as, for example, at least a part of a power management integrated circuit (PMIC). According to an embodiment, the power management module 360 may include a battery charging module. According to an embodiment, if another electronic device (e.g., one of the electronic device 101, the external electronic device 220, or the second electronic device 204) is electrically connected to the first electronic device 202 (wireless or wired connection), the power management module 360 may receive power from the another electronic device to charge the battery 370.

According to one embodiment, the battery 370 may supply power to at least one element of the first electronic device 202. According to an embodiment, battery 370 may include, for example, a rechargeable battery. According to an embodiment, when the first electronic device 202 is mounted inside the external electronic device 220, the first electronic device 202 may charge the battery 370 to a predetermined charge level, thereby turning on the first electronic device 202 or at least a portion of the communication module 310.

According to an embodiment, the interface 380 may support one or more specified protocols that may be used for the first electronic device 202 to directly connect with (e.g., wired connection) the electronic device 101, the external electronic device 220, the second electronic device 204, or another electronic device. According to an embodiment, the interface 380 may include, for example, a high-definition multimedia interface (HDMI), a USB interface, an SD card interface, or an audio interface. According to an embodiment, the interface 380 may include a connection port to establish a physical connection with the external electronic device 220.

According to an embodiment, the processor 390, for example, may execute software to control at least one other element (e.g., hardware or software elements) of the first electronic device 202 connected to the processor 390 and perform processing of a variety of data or operations. According to an embodiment, as at least part of data processing or operations, the processor 390 may load commands or data received from another element (e.g., the sensor module 330 or the communication module 310) in the volatile memory 350, process commands or data stored in the volatile memory 350, and store the resultant data in the nonvolatile memory.

According to an embodiment, the processor 390 may identify whether or not an electrical connection is established between the first electronic device 202 and the external electronic device 220 through the sensor module 330 or the interface 380. If the electrical connection is established between the first electronic device 202 and the external electronic device 220, the processor 390 may receive location information of the second electronic device 204 from the external electronic device 220.

According to an embodiment, the processor 390 may identify whether the state of the cover 203 of the external electronic device 220 is in an open state or in a closed state by recognizing a magnetic material mounted to the external electronic device 220 through a magnetic sensor included in the sensor module 330.

According to an embodiment, the processor 390 may determine whether or not an electronic connection is established between the first electronic device 202 and the external electronic device 220 by recognizing that a first charging port 206 included in the interface 380 comes into contact with the third charging port 215 or the fourth charging port 217 of the external electronic device 220.

According to an embodiment, the processor 390 may establish a communication connection with the electronic device 101 through the communication module 310 and receive data (e.g., audio data) from the electronic device 101 through the established communication connection. According to an embodiment, the processor 390 may transmit data received from the electronic device 101 to the second electronic device 204 through the communication module 310.

According to an embodiment, the processor 390 may perform operations of the first electronic device 202 to be described below.

According to an embodiment, the first electronic device 202 may further include various modules depending on its provision form. For example, other elements equivalent to the elements described above may be further included in the first electronic device 202. Alternatively or additionally, the first electronic device 202 according to an embodiment may exclude specific elements from the above elements or replace the same with other elements depending on its provision form. This may be understood by those of ordinary skill in the art.

According to an embodiment, the second electronic device 204 configured to be paired with the first electronic device 202 may include elements the same as or similar to those included in the first electronic device 202, and may perform all or some of operations of the second electronic device 204, which are described below with reference to the drawings.

Figure 4:
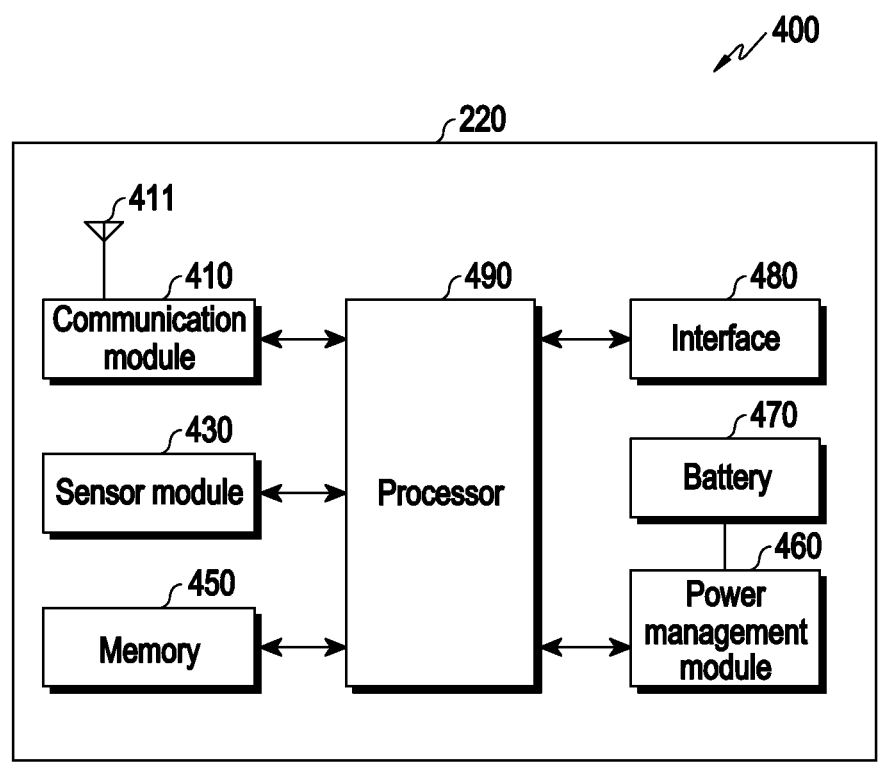
FIG. 4 is a block diagram illustrating the configuration of an external electronic device according to one embodiment.

FIG. 4 is a block diagram 400 illustrating the configuration of an external electronic device 220 according to one embodiment.

Referring to FIG. 4, the external electronic device 220 may include an antenna module 411, a communication module 410, a sensor module 430, a memory 450, a power management module 460, a battery 470, an interface 480, and a processor 490.

According to an embodiment, the communication module 410 may include at least one of a wireless communication module (e.g., a Bluetooth communication module, a cellular communication module, a Wi-Fi communication module, an NFC communication module, or a GNSS communication module) or a wired communication module (e.g., a LAN communication module or a PLC communication module).

The communication module 410 may directly or indirectly communicate with at least one of the first electronic device 202 and the second electronic device 204 using at least one communication module included therein. In an embodiment, the communication module 410 may transmit location information of the second electronic device 204 to the first electronic device 202 and transmit location information of the first electronic device 202 to the second electronic device 204. The communication module 410 may operate independently of the processor 490 and include one or more communication processors supporting wired or wireless communication. In an embodiment, the communication module 410 may also be referred to as a communication interface.

According to an embodiment, the antenna module 411 may transmit or receive signals or information to or from another electronic device (e.g., at least one of the first electronic device 202 or the second electronic device 204).

According to an embodiment, the antenna module 411 may include a plurality of antennas, and at least one antenna suitable for a communication scheme used in the communication network may be selected from the plurality of antennas by the communication module 410. Signals or information may be transmitted or received between the communication module 410 and another electronic device through the at least one selected antenna.

According to an embodiment, the sensor module 430 may identify whether the cover 203 of the external electronic device 220 is in an open state or in a closed state. The sensor module 430 may convert measured or identified information into an electrical signal. The sensor module 430 may include, for example, a magnetic sensor, an acceleration sensor, a gyro sensor, a geomagnetic sensor, a proximity sensor, a gesture sensor, a grip sensor, or a biometric sensor. In an embodiment, the sensor module 430 may further include an optical sensor. The optical sensor may include a light-emitting unit (e.g., an LED) that emits light in at least one wavelength band. The optical sensor may include a light-receiving unit (e.g., a photodiode) that receives light in one or more wavelength bands scattered or reflected from an object and produces an electrical signal.

According to an embodiment, the memory 450 may store a variety of data used by at least one element (e.g., the processor 490, the communication module 410, or the sensor module 430) of the external electronic device 220. The data may include, for example, software and input data or output data for instructions related thereto. According to an embodiment, the data may include location information of the first electronic device 202 or the second electronic device 202. The memory 450 may include a volatile memory or a nonvolatile memory.

According to an embodiment, the power management module 460 may manage power supplied to the external electronic device 220. According to an embodiment, the power management module 460 may be implemented as, for example, at least a part of the PMIC. According to an embodiment, the power management module 460 may include a battery charging module.

According to an embodiment, in the case where the power management module 460 is electrically connected to an external power supply device through wireless or wired connection, the power management module 460 may receive power supplied from the external power supply device to charge the battery 470.

According to an embodiment, if another electronic device (e.g., the electronic device 202 or the second electronic device 204) is electrically connected to the external electronic device 202 through wireless or wired connection, the power management module 460 may provide the power charged in the battery 470 to another electronic device.

According to an embodiment, the battery 470 may supply power to at least one element of the external electronic device 220. According to an embodiment, the battery 470 may supply power to the first electronic device 202 or the second electronic device 204. According to an embodiment, battery 470 may include, for example, a rechargeable battery.

According to an embodiment, the interface 480 may support one or more specified protocols to be used in order for the external electronic device 220 to directly connect (e.g., wired connection) with the first electronic device 202, the second electronic device 204, or another electronic device. According to an embodiment, the interface 480 may include, for example, an HDMI, a USB interface, an SD card interface, or an audio interface. According to an embodiment, the interface 480 may include a connection port for establishing a physical connection with the first electronic device 202 or the second electronic device 204.

According to an embodiment, the processor 490 may execute software to control at least one other element (e.g., hardware or software elements) of the external electronic device 220 connected to the processor 490 and perform processing of a variety of data or operations.

According to an embodiment, as at least part of data processing or operations, the processor 490 may load commands or data received from another element (e.g., the sensor module 430 or the communication module 410) in the volatile memory 450, process commands or data stored in the volatile memory 450, and store the resultant data in the nonvolatile memory.

According to an embodiment, the processor 490 may identify whether the state of the cover 203 of the external electronic device 220 is in the open state or the closed state through a magnetic sensor included in the sensor module 430.

According to an embodiment, the processor 490 may provide location information of a counterpart electronic device to the first electronic device 202 or the second electronic device 204, based on whether the state of the cover 203 of the external electronic device 220 is in the open state or in the closed state.

For example, the processor 490 may identify whether or not an electrical connection is established between the first electronic device 202 and the external electronic device 220 through the sensor module 430 or the interface 480, based on whether the state of the cover 203 of the external electronic device 220 is in the open state or in the closed state. According to an embodiment, the processor 490 may identify whether or not an electrical connection is established between the first electronic device 202 and the external electronic device 220 by recognizing that the third charging port 215 included in the interface 480 comes into contact with the first charging port 206 of the first electronic device 202. If an electrical connection is established between the first electronic device 202 and the external electronic device 220, the processor 490 may provide location information of the second electronic device 204 to the first electronic device 202.

Alternatively, the processor 490 may identify whether or not an electronic device is established between the second electronic device 204 and the external electronic device 220 through the sensor module 430 or the interface 480, based on whether the state of the cover 203 of the external electronic device 220 is in the open state or in the closed state. According to an embodiment, the processor 490 may identify whether or not an electrical connection is established between the second electronic device 204 and the external electronic device 220 by recognizing that the fourth charging port 217 included in the interface 480 comes into contact with the second charging port 208 of the second electronic device 204. If an electrical connection is established between the second electronic device 204 and the external electronic device 220, the processor 490 may provide location information of the first electronic device 202 to the second electronic device 204.

According to an embodiment, the processor 490 may perform operations of the external electronic device 220 to be described below.

According to an embodiment, the external electronic device 220 may further include various modules depending on its provision form. For example, other elements equivalent to the above-described elements may be further included in the external electronic device 220. Alternatively or additionally, the external electronic device 220 according to an embodiment may exclude specific elements from the above elements or replace the same with other elements depending on its provision form. This may be understood by those of ordinary skill in the art.

A first electronic device (e.g., the first electronic device 202) according to an embodiment may include at least one sensor 330, a first communication interface (e.g., the interface 380) configured to perform communications with an external electronic device (e.g., the external electronic device 220), a second communication interface (e.g., the communication module 310) configured to perform communications with a second electronic device (e.g., the second electronic device 204), and at least one processor 390 operably connected to the at least one sensor 330, the first communication interface 380, and the second communication interface 310. The at least one processor 390 may be configured to obtain location information of the first electronic device 202 through the at least one sensor 330. The at least one processor 390 may be configured to obtain location information of the second electronic device 204 from the external electronic device 220 or the second electronic device 204. The at least one processor 390 may be configured to determine connection operation information indicating at least one operation to be performed by the first electronic device 202 to establish a communication link with the second electronic device 204 and at least one parameter to be used for the at least one operation, based on the location information of the first electronic device 202 and the location information of the second electronic device 204. The at least one processor 390 may be configured to establish a communication link with the second electronic device 204, based on the connection operation information and the at least one parameter.

According to an embodiment, the first location information may include first information indicating whether the first electronic device 202 is located outside the external electronic device 220 or whether the first electronic device 202 is located inside the external electronic device 220. The second location information may include information indicating whether the second electronic device 204 is located outside the external electronic device 220 or whether the second electronic device 204 is located inside the external electronic device 220.

According to an embodiment, the first electronic device 202 may further include a memory 350. The at least one processor 390 may be configured to obtain the second location information from the external electronic device 220 based on the first electronic device 202 being located inside the external electronic device 220. The at least one processor 390 may be configured to obtain the second location information from the second electronic device 204 based on the first electronic device 202 being located outside the external electronic device 220. The at least one processor 390 may be configured to store the second location information in the memory 350.

According to an embodiment, the at least one processor 390 may be configured to determine the connection operation information and the at least one parameter further based on an open state or a closed state of a cover 203 of the external electronic device 220, the first location information, and the second location information. The open state or the closed state of the cover 203 of the external electronic device 220 may be identified by a first sensor included in the at least one sensor 330, or obtained from the external electronic device 220.

According to an embodiment, the at least one processor 390 may be configured to, based on a need to reconnect to the second electronic device 204, due to a disconnection of the first electronic device 202 from the second electronic device at a location outside of the external electronic device 220, and the first electronic device 202 being connected to a third electronic device, determine the at least one operation indicated by the connection operation information to indicate a page scan operation or a page operation and determine the at least one parameter indicated by the connection operation information to indicate performing the at least one operation for a particular time duration at a particular time interval, the particular time duration being shorter than a preset time, and the particular time interval being greater than a preset time interval.

According to an embodiment, the at least one processor 390 may be configured to, based on a need to reconnect to the second electronic device 204, due to a disconnection of the first electronic device 202 from the second electronic device 204 at a location outside of the external electronic device 220, and the first electronic device 202 and the second electronic device 204 being not connected to a third electronic device, determine the at least one operation indicated by the connection operation information to indicate at least one of a page operation and a page scan operation and determine the at least one parameter indicated by the connection operation information to indicate performing the at least one operation for a particular time duration at a particular time interval, the particular time duration being shorter than a preset time, and the particular time interval being greater than a preset time interval.

According to an embodiment, the at least one processor 390 may be configured to, based on the cover 203 of the external electronic device 220 being in an open state and the first electronic device 202 and the second electronic device 204 being at a location inside of the external electronic device 220, determine the at least one operation indicated by the connection operation information to indicate a page operation or a page scan operation and determine the at least one parameter indicated by the connection operation information to indicate performing the at least one operation for a particular time duration at a particular time interval, the particular time duration being longer than a preset time, and the particular time interval being less than a preset time interval.

According to an embodiment, the at least one processor 390 may be configured to, based on the cover 203 of the external electronic device 220 being in an open state, the first electronic device 202 being at a first location inside of the external electronic device 220, and the second electronic device 204 being at a second location outside of the external electronic device 220, determine the at least one operation indicated by the connection operation information to indicate a page operation and determine the at least one parameter indicated by the connection operation information to indicate performing the at least one operation for a particular time duration at a particular time interval, the particular time duration being longer than a preset time, and the particular time interval being less than a preset time interval.

According to an embodiment, the at least one processor 390 may be configured to, based on the cover 203 of the external electronic device 220 being in an open state, the first electronic device 202 being at a first location outside of the external electronic device 220, and the second electronic device 204 being at a second location inside of the external electronic device 220, to determine the at least one operation indicated by the connection operation information to indicate a page scan operation and determine the at least one parameter indicated by the connection operation information to indicate performing the at least one operation for a particular time duration at a particular time interval, the particular time duration being shorter than a preset time, and the particular time interval being greater than a preset time interval.

An electronic device (e.g., the external electronic device 220) according to an embodiment may include at least one sensor 430, a communication interface (e.g., the communication module 410) configured to perform communication with a first external electronic device (e.g., the first electronic device 202) or a second external electronic device (e.g., the second electronic device 204), and at least one processor 490 operably connected to the at least one sensor 430 and the communication interface 410. The at least one processor 490 may be configured to identify whether the first external electronic device 202 or the second external electronic device 204 is mounted to the electronic device 220 through the at least one sensor 430 to obtain an identification result. The at least one processor 490 may be further configured to identify first location information of the first external electronic device 202 or second location information of the second external electronic device 204, based on the identification result. The at least one processor 490 may be further configured to, based on a first request from the first external electronic device 202, transmit the second location information to the first external electronic device 202. The at least one processor 490 may be further configure to, based on a second request from the second external electronic device, transmit the first location information to the second external electronic device 204. The first location information and the second location information may be configured to be used to determine connection operation information indicating at least one operation to be performed by each of the first external electronic device 202 and the second external electronic device 204 to establish a communication link and at least one parameter to be used for the connection operation information.

According to an embodiment, the first electronic device 202 and the second electronic device 204 may use location information of a counterpart electronic device (the second electronic device 204 or the first electronic device 202), as well as its own location information, in order to change various connection parameters used for connection before a communication link is established therebetween.

For example, in order to connect with the second electronic device 204 through Bluetooth communication, the first electronic device 202 may change at least one connection parameter, based on the location information of the first electronic device 202 and the location information of the second electronic device 204. Similarly, in order to connect with the first electronic device 202 through Bluetooth communication, the second electronic device 204 may change at least one connection parameter, based on the location information of the second electronic device 204 and the location information of the first electronic device 202.

The first electronic device 202 or the second electronic device 204 respectively identify its own location, based on a sensor 330 (e.g., a non-contact sensor such as a magnetic sensor or a proximity sensor, or a contact sensor based on whether the charging port is in contact). The first electronic device 202 or the second electronic device 204 may directly or indirectly use the external electronic device 220 in order to obtain location information of a counterpart electronic device.

According to an embodiment, the external electronic device 220 may be used to store the first electronic device 202 and/or the second electronic device 204 or charge the first electronic device 202 and/or the second electronic device 204. The external electronic device 220 may include a configuration (e.g., the magnetic material (e.g., a magnet or an electromagnet) 219 or 221 in FIG. 2B, or a sensor circuit) in order for the first electronic device 202 or the second electronic device 204 to recognize the open or closed state of a cover 203 through a sensor (e.g., the first sensor 210 or the second sensor 212 in FIG. 2A). The external electronic device 220 may exchange a variety of information including location information of a counterpart electronic device with the first electronic device 202 or the second electronic device 204, based on a wired or wireless communication scheme.

Hereinafter, operations of the first electronic device 202, the second electronic device 204, and the external electronic device 220 are described with reference to FIGS. 5 to 7.

Figure 5:
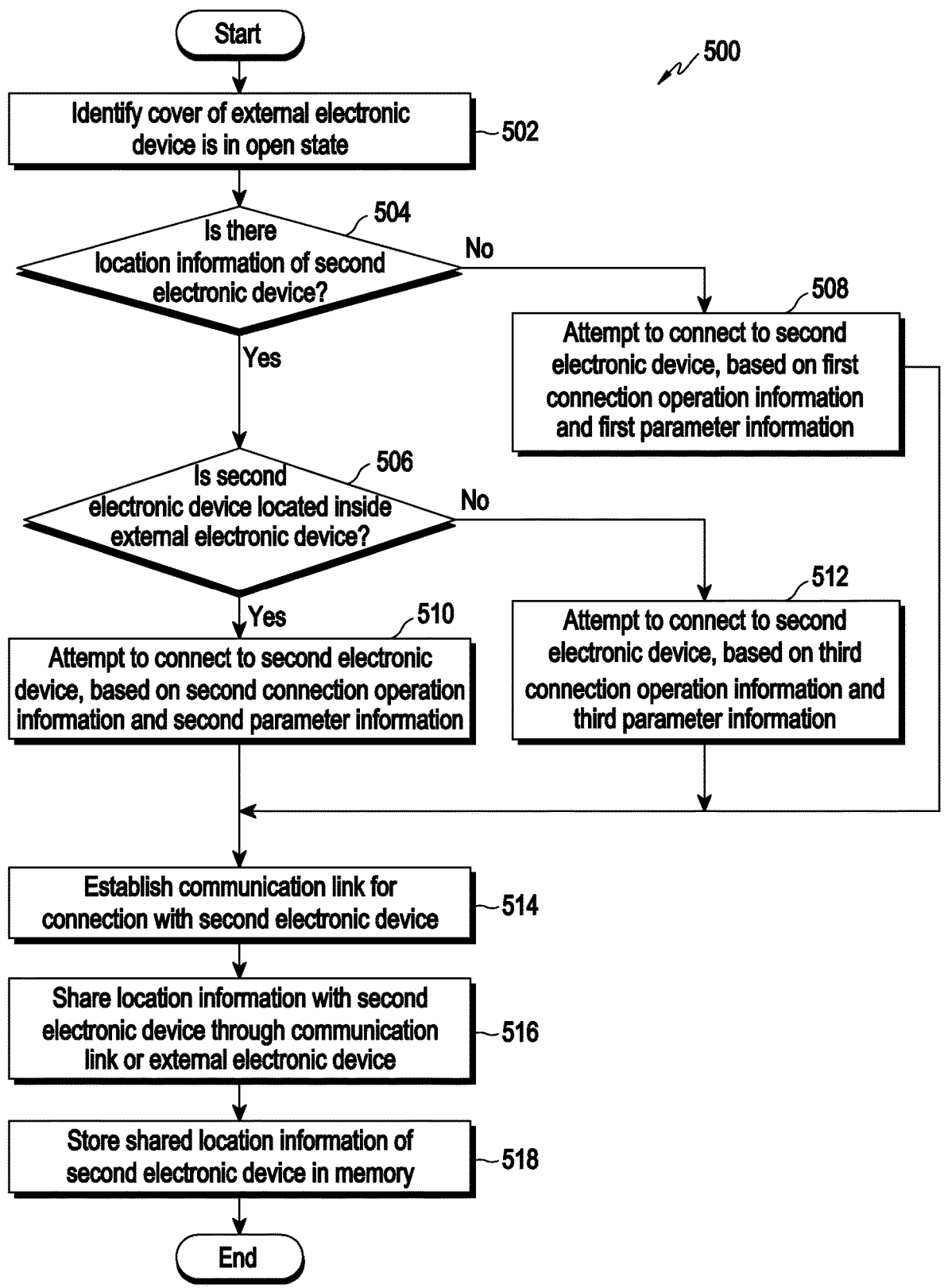
FIG. 5 is a flowchart illustrating the operation of a first electronic device for establishing a connection with a second electronic device according to one embodiment.

FIG. 5 is a flowchart 500 illustrating the operation of a first electronic device for establishing a connection with a second electronic device according to one embodiment.

According to embodiments, the first electronic device may be one of the first electronic device 202 and the second electronic device 204, and the second electronic device may be the remaining one of the first electronic device 202 and the second electronic device 204. According to embodiments, the operations illustrated in FIG. 5 are not limited to the illustrated sequence and may be performed in various sequences. According to embodiments, more or fewer operations than those illustrated in FIG. 5 or at least one of the operations may be performed.

Referring to FIG. 5, in operation 502, the first electronic device may identify whether or not the cover 203 of the external electronic device 220 is in the open state. In an embodiment, the first electronic device may identify whether or not the cover 203 of the external electronic device 220 is in the open state while the first electronic device is located inside the external electronic device 220 (e.g., in the first mounting part 211 or the second mounting part 213 in FIG. 2B). The first electronic device may identify whether or not the cover 203 of the external electronic device 220 is in the open state, based on the magnetic force sensed by a sensor 330 (e.g., a magnetic sensor such as a Hall sensor), regardless of whether or not the first electronic device is located inside the external electronic device 220. Alternatively, the first electronic device may identify whether or not the cover 203 of the external electronic device 220 is in the open state through wireless communication with the external electronic device 220.

If it is identified that the cover 203 of the external electronic device 220 is in the open state, the first electronic device may perform a booting operation and a Bluetooth function enablement operation. In an embodiment, the Bluetooth function enablement operation may include an operation of activating a Bluetooth communication module of the first electronic device.

In operation 504, the first electronic device may identify whether or not there is location information of the second electronic device. For example, the first electronic device may identify whether or not there is location information of the second electronic device stored in the first electronic device or whether or not there is location information of the second electronic device received from the second electronic device through Bluetooth communication.

If there is no location information of the second electronic device, the first electronic device may attempt to connect to the second electronic device, based on first connection operation information and first parameter information in operation 508. In an embodiment, the first connection operation information may be information indicating at least one operation to be performed by the first electronic device for a connection with the second electronic device. For example, the first connection operation information may indicate at least one of a page operation, a page scan operation, BLE advertising, or a BLE scan operation. The first connection operation information may indicate an operation of the first electronic device, which is included in one of a first connection pre-operation to a fourth connection pre-operation shown in Table 1 below. According to an embodiment, the first connection operation information may indicate a connection operation (e.g., a page operation or a page scan operation) based on a third connection pre-operation. The connection operation based on the third connection pre-operation may be performed for a preset time after the Bluetooth function is enabled. The connection operation based on the third connection pre-operation may be performed even when the first electronic device needs to perform a default operation.

TABLE 1

| | Description |
|---|---|
| First Connection Pre-Operation | Both first electronic device and second electronic device perform page operation and page scan operation |
| Second Connection Pre-Operation | Both first electronic device and second electronic device perform BLE advertising and BLE scan operation |
| Third Connection Pre-Operation | One of first electronic device and second electronic device performs page operation, and remaining one of first electronic device and second electronic device performs page scan operation |
| Fourth Connection Pre-Operation | One of first electronic device and second electronic device performs BLE advertising, and remaining one of first electronic device and second electronic device performs BLE scan operation |

In an embodiment, the first parameter information may include at least one parameter related to the at least one operation (e.g., the page operation or the page scan operation) indicated by the first connection operation information. For example, the first parameter information may be determined based on Table 2 below. According to an embodiment, the first parameter information may include at least one parameter for a page operation or a page scan operation.

TABLE 2

| | Parameter Information |
|---|---|
| Page Operation | Page timeout information, and/or page transmission (Tx) power information |
| Page Scan Operation | Page scan interval information, page scan window size information, and/or antenna reception (Rx) path information |
| BLE Advertising | Advertising interval information, advertising channel information, and/or advertising transmission (Tx) power information |
| BLE Scan Operation | BLE scan interval information, BLE scan window size information, and/or antenna reception path information |

If there is location information of the second electronic device in operation 504, the first electronic device may determine whether or not the second electronic device is located inside the external electronic device, based on the location information of the second electronic device, in operation 506.

If the second electronic device is located inside the external electronic device 220, the first electronic device may attempt to connect to the second electronic device, based on second connection operation information and second parameter information in operation 510.

If the second electronic device is not located inside the external electronic device 220, the first electronic device may attempt to connect to the second electronic device, based on third connection operation information and third parameter information in operation 512.

In an embodiment, the second connection operation information and the second parameter information, or the third connection operation information and the third parameter information may be determined based on Tables 1 and 2 described above, and may be different from or the same as the first connection operation information and the first parameter information.

In operation 514, the first electronic device may establish a communication link for connection with the second electronic device, based on the connection attempt operation performed in one of operations 508, 510, and 512.

In operation 516, the first electronic device may share location information with the second electronic device through the communication link or the external electronic device 220. For example, the first electronic device may exchange location information with the second electronic device through the communication link, obtain location information of the second electronic device from the external electronic device 220, or provide location information of the first electronic device to the external electronic device 220. Communication with the external electronic device 220 may be performed based on wired or wireless communication (e.g., Bluetooth or Wi-Fi).

In an embodiment, the first electronic device may share location information with the second electronic device through the communication link or the external electronic device 220 at the time at which disconnection from the second electronic device is required (for example, when the cover 203 of the external electronic device 220 is closed in the state in which the first electronic device and the second electronic device are mounted to the external electronic device 220). In an embodiment, the first electronic device may share location information with the second electronic device through the communication link at the time at which disconnection from the second electronic device is required (for example, when the communication link is released as the first electronic device and the second electronic device are spaced far).

In operation 518, the first electronic device may store the shared location information of the second electronic device in a memory (e.g., the memory 350) of the first electronic device. In an embodiment, if the location information of the second electronic device is obtained through the communication link, the first electronic device may store the obtained location information in a nonvolatile memory of the first electronic device. In an embodiment, if the location information of the second electronic device is obtained through the external electronic device 220, the first electronic device may store the obtained location information in a volatile memory of the first electronic device. The location information stored in the volatile memory may be stored in a nonvolatile memory when the cover 203 of the external electronic device 220 is closed.

In an embodiment, if the Bluetooth function of the first electronic device is re-enabled after the connection with the second electronic device is released, the first electronic device may use the location information of the second electronic device stored in the nonvolatile memory. For example, if the Bluetooth function is re-enabled, the first electronic device may use the location information of the second electronic device stored in the nonvolatile memory in order to determine connection operation information and parameter information for performing a connection with the second electronic device.

Figure 6A:
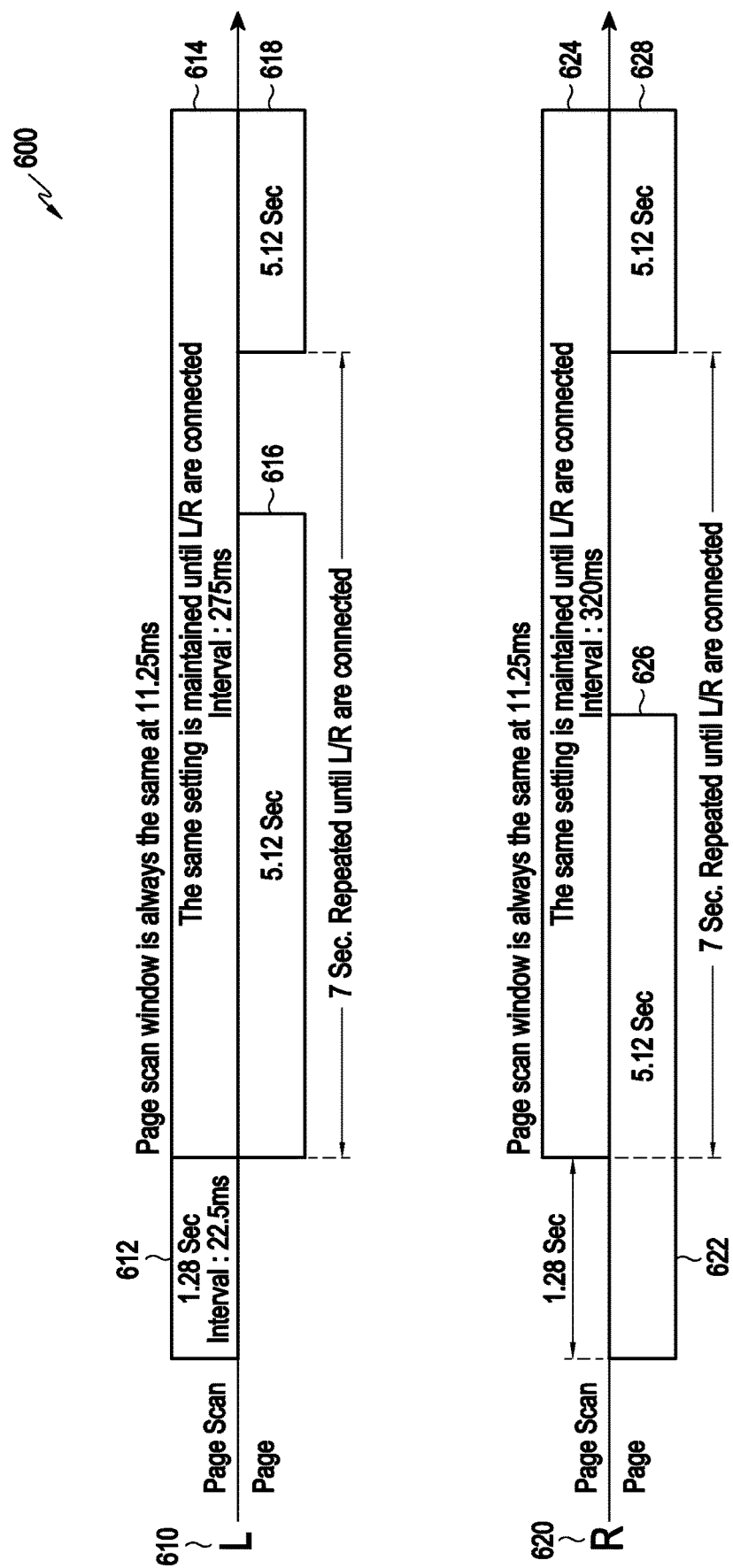
FIG. 6A is a graph on a time axis illustrating an operation of establishing a connection between a first electronic device and a second electronic device according to one embodiment.

FIG. 6A is a graph 600 on a time axis illustrating an operation of establishing a connection between a first electronic device and a second electronic device according to one embodiment. According to embodiments, one of a first electronic device (e.g., the first electronic device 202) and a second electronic device (e.g., the second electronic device 204) may be a left earbud device 610 that may be worn on a user's left ear, and the remaining one of the first electronic device and the second electronic device may be a right earbud device 620 that may be worn on a user's right ear.

The operations of the left earbud device 610 and the right earbud device 620 shown in FIG. 6A may be performed in the case, for example, where the left earbud device 610 and the right earbud device 620 do not have location information of a counterpart earbud device or where both the earbud device 610 and the right earbud device 620 are located inside the external electronic device 220. In this regard, connection operation information of the left earbud device 610 and the right earbud device 620 may be determined, for example, as shown in Table 3. In addition, as parameter information, a page scan interval may be determined to be, for example, 22.5 ms, and a page scan duty according thereto may be the same as shown in Table 3.

TABLE 3

| | Connection Operation Information | Page Scan Duty |
|---|---|---|
| Left Earbud Device 610 | Page Scan | 11.25 ms × 2/22.5 ms |
| Right Earbud Device 620 | Page | — |

Referring to FIG. 6A, the left earbud device 610 and the right earbud device 620 may perform a page scan operation and a page operation, respectively, based on the connection operation information determined as shown in Table 3 when the Bluetooth function is enabled. According to an embodiment, the left earbud device 610 may perform a page scan operation 612 at a configured page scan time interval (e.g., 22.5 ms) for a preset time period (e.g., 1.28 sec) after the Bluetooth function is enabled. The right earbud device 620 may perform a page operation 622 for a preset time period (e.g., 1.28 sec) after the Bluetooth function is enabled.

In an embodiment, if the left earbud device 610 and the right earbud device 620 fail to connect for a preset time, they may perform the page scan operation and the page operation by changing the connection operation information and at least one parameter.

In the embodiment in FIG. 6A, the left earbud device 610 may change the page scan interval (e.g., from 22.5 ms to 275 ms) after a preset time period (e.g., 1.28 sec) has elapsed, and perform a page scan operation at the changed page scan interval. The left earbud device 610 may perform a page scan operation 614 for a preset time period (e.g., 11.25 ms) at the changed page scan time interval (e.g., 275 ms) until it is connected to the right earbud device 620. The left earbud device 610 may perform page operations 616 and 618 for a preset time (e.g., 5.12 sec) at a preset time interval (e.g., 7 sec) while performing the page scan operation 614.

If a preset time (e.g., 1.28 sec) elapses, the right earbud device 620 may perform a page scan operation 624 for a preset time (e.g., 11.25 ms) at a configured page scan time interval (e.g., 320 ms) until it is connected to the left earbud device 610. In addition, if the preset time (e.g., 1.28 sec) elapses, the right earbud device 620 may perform page operations 626 and 628 for a preset time (e.g., 3.84 sec and 5.12 sec) at a preset time interval (e.g., 7 sec).

In this regard, the changed connection operation information and the changed page scan duty of the left earbud device 610 and the right earbud device 620 may be summarized, for example, as shown in Table 4.

TABLE 4

| | Connection Operation Information | Page Scan Duty |
|---|---|---|
| Left Earbud Device 610 | Page/Page Scan | 11.25 ms × 2/275 ms |
| Right Earbud Device 620 | Page/Page Scan | 11.25 ms × 2/320 ms |

In an embodiment, the connection operation information and the page scan duty in Table 4 may be used until the left earbud device 610 and the right earbud device 620 are connected. Alternatively, if the left earbud device 610 and the right earbud device 620 are connected and then disconnected, the connection operation information and the page scan duty in Table 4 may be used for reconnection.

According to an embodiment, the page scan duty (or page scan intervals) in Tables 3 and 4 may be used identically or differently for the left earbud device 610 and the right earbud device 620. In addition, the page scan duty (or page scan interval) may be greater or smaller than the values shown in Tables 3 and 4.

According to an embodiment, the connection operation information and the page scan duty (or page scan interval) of the left earbud device 610 shown in Tables 3 and 4 may be used for the right earbud device 620, and the connection operation information and the page scan duty of the right earbud device 620 may be used for the left earbud device 610.

Figure 6B:
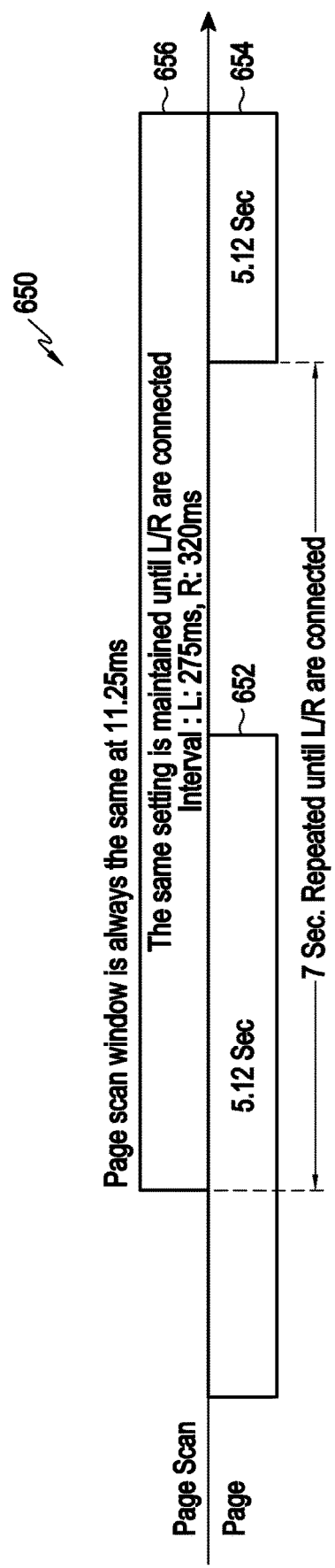
FIG. 6B is a graph on a time axis illustrating a connection establishment operation of a first electronic device in the case where the first electronic device has location information of a second electronic device according to one embodiment.

FIG. 6B is a graph 650 on a time axis illustrating a connection establishment operation of the first electronic device if the first electronic device has location information of the second electronic device according to one embodiment. According to embodiments, the first electronic device may be one of the first electronic device 202 and the second electronic device 204, and the second electronic device may be the remaining one of the first electronic device 202 and the second electronic device 204.

The operation of the first electronic device shown in FIG. 6B may be performed in the case where, for example, the first electronic device has location information of the second electronic device, where the location information of the second electronic device indicates that the second electronic device is located outside an external electronic device (e.g., the external electronic device 220), and where the first electronic device is located inside the external electronic device.

Referring to FIG. 6B, if the Bluetooth function is enabled, the first electronic device may perform a page operation 652 for a preset time (e.g., 5.12 sec). The first electronic device may start a page scan operation 656 after a preset time after the page operation 652 is started. The page scan operation 656 may be performed at a first page scan time interval (e.g., 275 ms) in the case where the first electronic device is a left earbud device, and may be performed at a second page scan time interval (e.g., 320 ms) in the case where the first electronic device is a right earbud device. The first page scan time interval and the second page scan time interval may be different or the same.

The first electronic device may perform the page operation 654 again if a preset time (e.g., 7 sec) elapses from the time at which the page scan operation 656 is started. The page scan operation 656 and the page operation 652 or 654 performed by the first electronic device may be repeated until the first electronic device is connected to the second electronic device.

Figure 7:
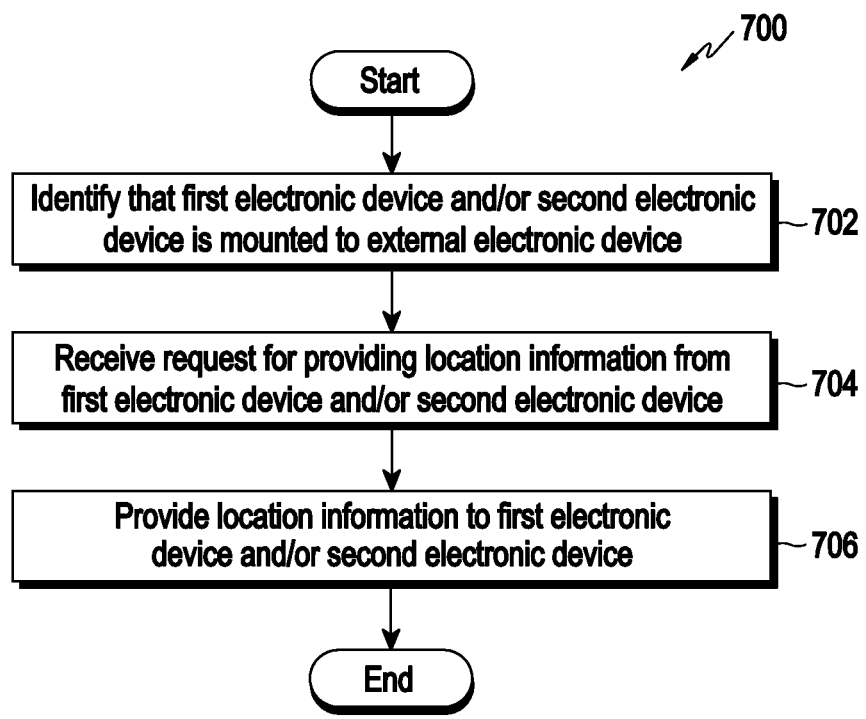
FIG. 7 is a flowchart illustrating the operation of an external electronic device to provide location information to a first electronic device and a second electronic device according to one embodiment.

FIG. 7 is a flowchart 700 illustrating the operation of the external electronic device 220 for providing location information to a first electronic device and a second electronic device according to one embodiment. According to embodiments, the operations illustrated in FIG. 7 are not limited to the illustrated sequence and may be performed in various sequences. According to embodiments, more or fewer operations than those illustrated in FIG. 7 or at least one of the operations may be performed.

Referring to FIG. 7, in operation 702, the external electronic device 220 may identify that a first electronic device (e.g., the first electronic device 202) and/or a second electronic device (e.g., the second electronic device 204) has been mounted to an external electronic device 220. In an embodiment, the external electronic device 220 may identify that the first electronic device 202 has been mounted to the external electronic device 220 if a charging port (e.g., the first charging port 206) of the first electronic device 202 comes into contact with a charging port (e.g., the third charging port 215 or the fourth charging port 217) of the external electronic device 220. In addition, the external electronic device 220 may identify that the second electronic device 204 has been mounted to the external electronic device 220 if a charging port (e.g., the second charging port 208) of the second electronic device 204 comes into contact with the charging port (e.g., the third charging port 215 or the fourth charging port 217) of the external electronic device 220.

In operation 704, the external electronic device 220 may receive a request for providing location information from the first electronic device 202 and/or the second electronic device 204. In an embodiment, the external electronic device 220 may receive a request for providing location information from the first electronic device 202 and/or the second electronic device 204 using at least one of a wired communication scheme such as PLC communication, or a wireless communication scheme such as Bluetooth or BLE communication. In an embodiment, the request for providing location information received from the first electronic device 202 may be a request for providing location information of the second electronic device 204, and the request for providing location information received from the second electronic device 204 may be a request for providing location information of the first electronic device 202.

In an embodiment, the external electronic device 220 may receive the location information provision request if the first electronic device 202 and/or the second electronic device 204 is mounted to the external electronic device 220 or rebooted inside the external electronic device 220. However, the location information provision request is not limited to the above situation, and may be received in various situations requiring a connection between the first electronic device 202 and the second electronic device 204.

In response to the location information provision request received in operation 704, the external electronic device 220 may provide location information to the first electronic device 202 and/or the second electronic device 204 in operation 706. In an embodiment, the location information provided to the first electronic device 202 (e.g., location information of the second electronic device 204) and the location information provided to the second electronic device 204 (e.g., location information of the first electronic device 202) may be the same as shown in Table 5 below.

TABLE 5

| | |
|---|---|
| Location Information of First Electronic Device 202 | First electronic device is located inside external electronic device 220 |
| | First electronic device is located outside external electronic device 220 |
| Location Information of Second Electronic Device 204 | Second electronic device is located inside external electronic device 220 |
| | Second electronic device is located outside external electronic device 220 |

Referring to Table 5, the location information of the first electronic device 202 may include information indicating that the first electronic device 202 is located inside the external electronic device 220 or information indicating that the first electronic device 202 is located outside the external electronic device 220. In addition, the location information of the second electronic device 204 may include information indicating that the second electronic device 204 is located inside the external electronic device 220 or information indicating that the second electronic device 204 is located outside the external electronic device 220.

According to an embodiment, the external electronic device 220 may provide mounting state information of the first electronic device 202 and the second electronic device 204 as location information. For example, the external electronic device 220 may provide one of three pieces of information shown in Table 6 as location information.

TABLE 6

| Location Information | Indication |
|---|---|
| Single | Eithr first electronic device 202 or second electronic device 204 is located inside external electronic device 220 |

TABLE 6-continued

| Location Information | Indication |
|---|---|
| Double | Both first electronic device 202 and second electronic device 204 are located inside external electronic device 220 |
| Unknown | Location of first electronic device 202 or second electronic device 204 is unknown |

Referring to Table 6, if the first electronic device 202 or the second electronic device 204 is located inside the external electronic device 220, the external electronic device 220 may provide "single" indicating that only one electronic device is located inside the external electronic device 220 to the first electronic device 202 or the second electronic device 204. In addition, if both the first electronic device 202 and the second electronic device 204 are located inside the external electronic device 220, the external electronic device 220 may provide "double" indicating that both electronic devices are located inside the external electronic device 220 to the first electronic device 202 or the second electronic device 204. If location of the first electronic device 202 or the second electronic device 204 is unknown, the external electronic device 220 may provide "unknown" indicating that the location information is not recognized to the first electronic device 202 or the second electronic device 204.

According to an embodiment, if the first electronic device 202 and/or the second electronic device 204 is asynchronously mounted to or detached from the external electronic device 220 (e.g., in the case of occurrence of an event in which the second electronic device 204 is mounted to the external electronic device 220 while only the first electronic device 202 is mounted to the external electronic device 220), the external electronic device 220 may provide updated location information (e.g., updated information from "single" to "double") to the first electronic device 202 and/or the second electronic device 204.

According to an embodiment, the operation of providing location information of a counterpart electronic device to the first electronic device 202 or the second electronic device 204 may be performed regardless of whether the cover 203 of the external electronic device 220 is in the open state or closed state.

According to an embodiment, three cases shown in Table 7 below may be considered based on the location information of each of the first electronic device 202 and the second electronic device 204. In an embodiment, if the location information of a counterpart electronic device is unknown (e.g., if "unknown" is received as location information of a counterpart electronic device), the first electronic device 202 or the second electronic device 204 may use default location information stating that the counterpart electronic device is located inside the external electronic device 220.

TABLE 7

| | |
|---|---|
| Case 1 | State in which both first electronic device 202 and second electronic device 204 are located inside external electronic device 220 |
| Case 2 | State in which both first electronic device 202 and second electronic device 204 are located outside external electronic device 220 |
| Case 3 | State in which one of first electronic device 202 and second electronic device 204 is located outside external electronic device 220, and remaining one of first electronic device 202 and second electronic device 204 is located inside external electronic device 220 |

According to an embodiment, the cases shown in Table 7 may be subdivided in consideration of whether or not the first electronic device 202 or the second electronic device 204 is attached to/detached from the ear and/or the audio service provision state.

According to an embodiment, the respective operations for establishing a connection may be performed differently in the three cases shown in Table 7.

In Case 1, that is, in the case where the cover 203 of the external electronic device 220 is opened while both the first electronic device 202 and the second electronic device 204 are located inside the external electronic device 220, it may be determined that there is a user's intention to use the first electronic device 202 and the second electronic device 204. Therefore, the first electronic device 202 and the second electronic device 204 may establish a communication link as quickly as possible. To this end, the operations of the first electronic device 202 and the second electronic device 204 are described in detail with reference to FIG. 8. Hereinafter, a description is made based on the case where the first electronic device 202 is the first electronic device 202 and the second electronic device 204 is the second electronic device 204 by way of example.

Figure 8:
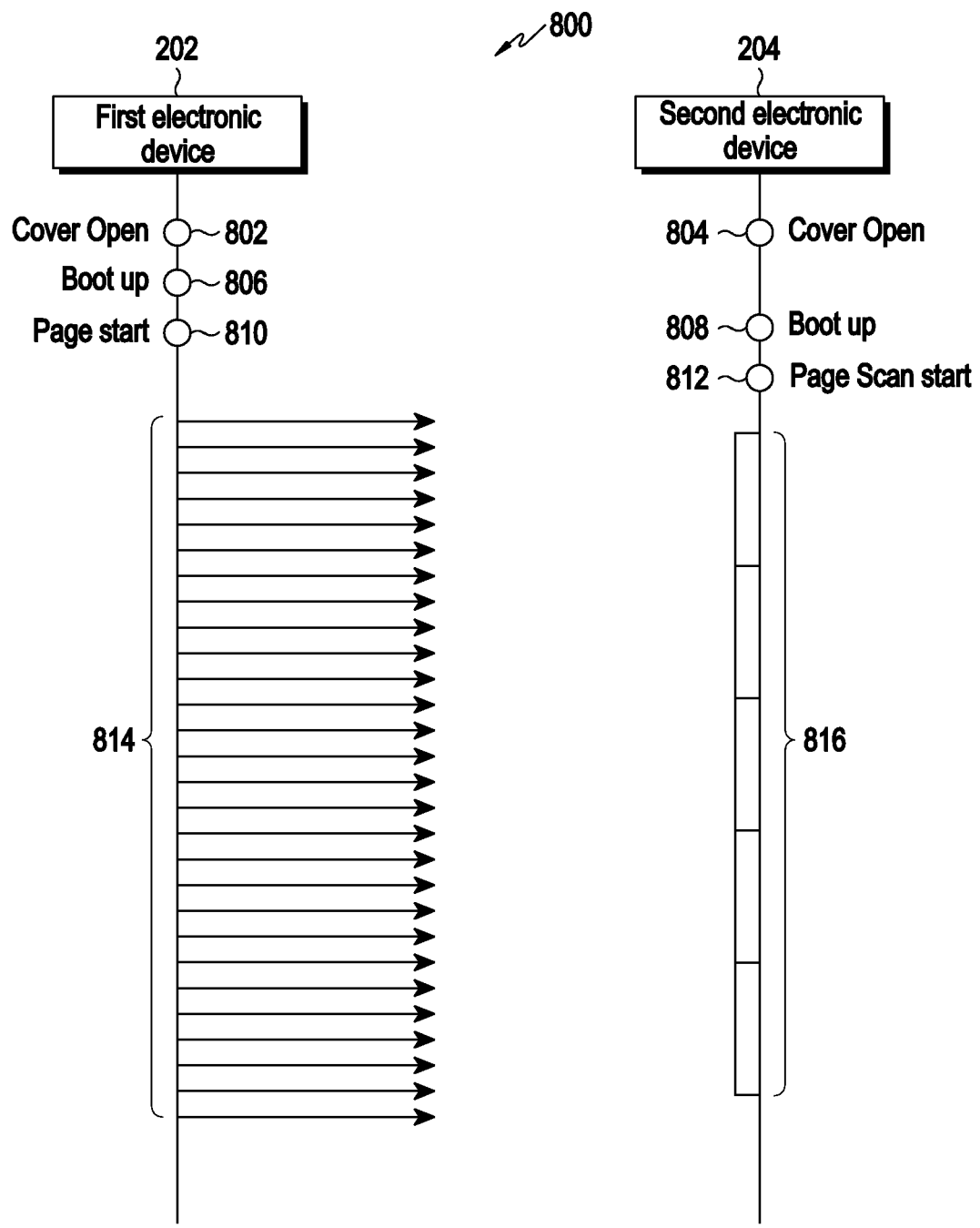
FIG. 8 is a signal flowchart illustrating a connection establishment operation that may be performed in a state where a first electronic device and a second electronic device are located inside an external electronic device according to one embodiment.

FIG. 8 is a signal flowchart 800 illustrating a connection establishment operation that may be performed while the first electronic device 202 and the second electronic device 204 are located inside the external electronic device 220 according to one embodiment.

Referring to FIG. 8, the first electronic device 202 and the second electronic device 204 may identify that the cover 203 of the external electronic device 220 is in the open state while the first electronic device 202 and the second electronic device 204 are located inside the external electronic device 220 in operations 802 and 804, respectively. If it is identified that the cover 203 of the external electronic device 220 is in the open state, the first electronic device 202 and the second electronic device 204 may perform a booting operation in operations 806 and 808, respectively. Additionally, each of the first electronic device 202 and the second electronic device 204 may perform a Bluetooth function enablement operation.

For a rapid connection between the first electronic device 202 and the second electronic device 204, one (e.g., the first electronic device 202) of the first electronic device 202 and the second electronic device 204 may determine to initiate a page operation in operation 810, and the remaining one (e.g., the second electronic device 204) of the first electronic device 202 and the second electronic device 204 may determine to initiate a page scan operation in operation 812. Accordingly, the first electronic device 202 may perform a page operation in operation 814, and the second electronic device 204 may perform a page scan operation in operation 816. As described above, if each electronic device performs one operation (the page operation or the page scan operation) different from the operation of the counterpart device, a connection success probability may increase.

In an embodiment, the page operation may include an operation of transmitting a connection request. The connection request may be performed by transmitting an identity (ID) packet including a device access code (DAC). The DAC may be determined based on the Bluetooth device address (BD_ADDR) of the electronic device (e.g., the first electronic device 202 or the second electronic device 204) receiving the connection request. The period of the connection request, that is, the period in which the ID packet is transmitted may be determined based on at least one of a task priority, power, and battery capacity of the electronic device performing the page operation.

In an embodiment, the page scan operation may include an operation in which the electronic device (e.g., the first electronic device 202 or the second electronic device 204) performing the page scan operation identifies whether or not there is a connection request (or whether or not there is a transmitted ID packet) every preset time using its own BD_ADDR. In general, the page scan operation may be performed every 11.25 ms/1.28 sec, but the cycle of performing the page scan operation may vary depending on power and battery capacity of an electronic device performing the page scan operation.

The first electronic device 202 or the second electronic device 204 may use current consumption and resources to the maximum in order to increase the probability of successful connection. For example, the first electronic device 202 or the second electronic device 204 may perform an operation of transmitting an ID packet using 100% resources (i.e., performing only a page operation instead of other operations).

In an embodiment, the time required for the booting operation and enabling the Bluetooth function may be the same between the first electronic device 202 and the second electronic device 204. In consideration of this, a delay time may be added prior to the initiation of the page operation and the page scan operation in operation 810 or 812. In an embodiment, the delay time may be added prior to operation 810 or operation 812 in order to prevent a situation in which the first electronic device 202 and the second electronic device 204 fail to connect to each other because they perform the page operation or the page scan operation at the same time. The delay time may be determined randomly or to be a fixed time to be used.

Meanwhile, unlike the embodiment shown in FIG. 8, one of the first electronic device 202 and the second electronic device 204 may perform BLE advertising, and the remaining one of the first electronic device 202 and the second electronic device 204 may perform a BLE scan operation. In an embodiment, in the case where the first electronic device 202 or the second electronic device 204 performs BLE advertising or a BLE scan operation, the BLE advertising may be performed at an interval shorter than that of general BLE advertising, or the BLE scan operation may be performed for a duty higher than an existing duty.

In an embodiment, the BLE advertising may include an operation of periodically transmitting a BLE advertising packet including advertising data to find an electronic device (e.g., the first electronic device 202 or the second electronic device 204) capable of BLE communication.

In an embodiment, the BLE scan operation may include an operation for monitoring whether or not a BLE advertising packet is received. The BLE scan operation may include an active scan operation and a passive scan operation. The active scan operation may include operations of transmitting a scan request to the electronic device that has transmitted a BLE advertising packet after receiving the BLE advertising packet and receiving a scan response from the electronic device that has transmitted the BLE advertising packet. The scan request may include information indicating that a BLE advertising packet has been received. The passive scan operation may indicate an operation in which transmission of a scan request may be omitted even if a BLE advertising packet is received.

Referring back to Table 6, in Case 2, that is, in the case where the first electronic device 202 and the second electronic device 204 are to attempt a connection while both of them are located outside the external electronic device 220, the first electronic device 202 and the second electronic device 204 may not be aware of locations and states of thereof. Accordingly, both the first electronic device 202 and the second electronic device 204 may perform a page scan operation at a very low duty (e.g., the page scan duty shown in Table 4) and intermittently perform a page operation. According to an embodiment, the first electronic device 202 and the second electronic device 204 may not be connected to the electronic device 101 (e.g., a smartphone) shown in FIG. 1. In this case, the connection establishment operation shown in FIG. 9A may be performed.

Figure 9A:
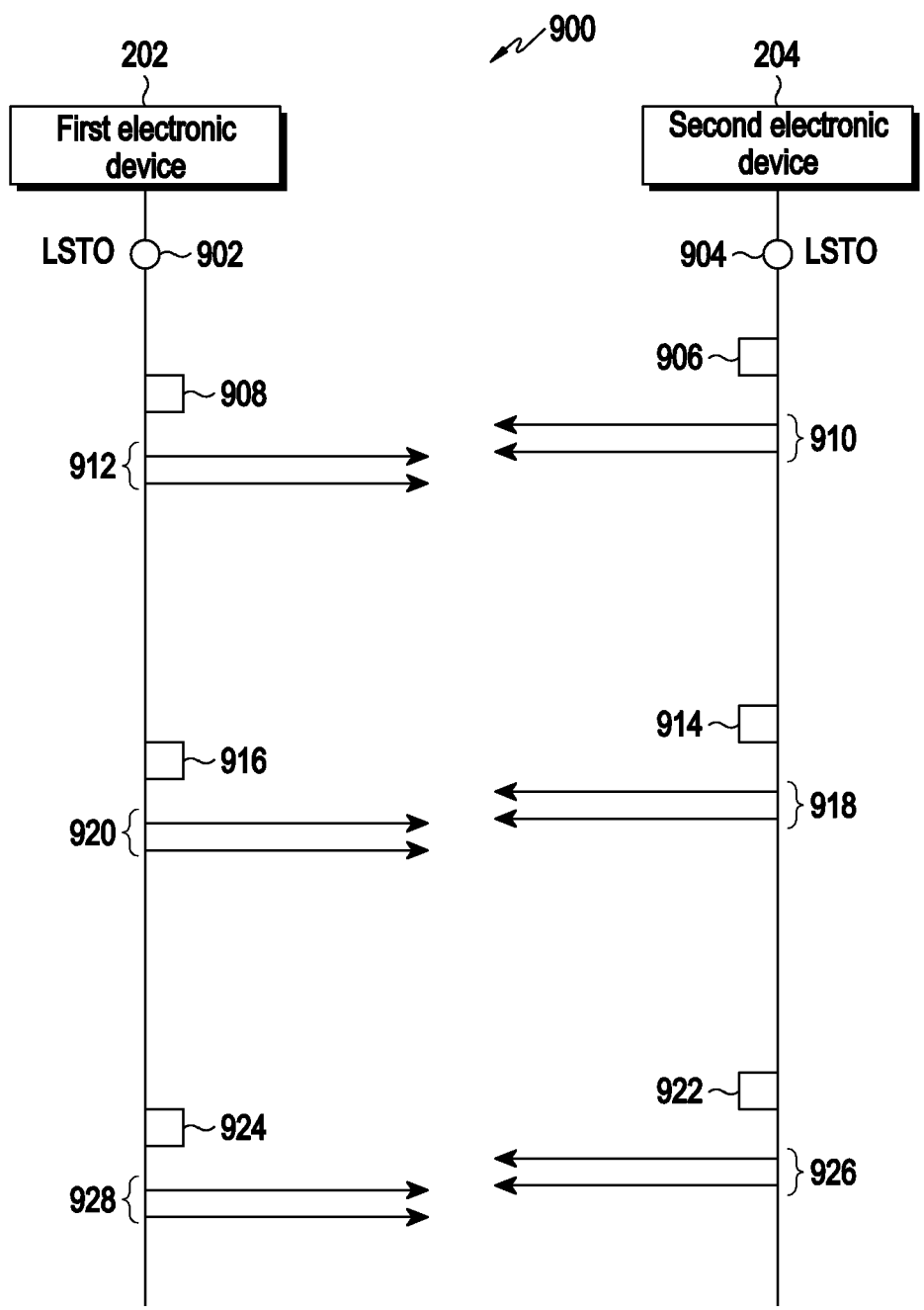
FIG. 9A is a signal flowchart illustrating an example of a connection establishment operation that may be performed in a state where a first electronic device and a second electronic device are located outside an external electronic device according to one embodiment.

FIG. 9A is a signal flowchart 900 illustrating an example of a connection establishment operation that may be performed while the first electronic device 202 and the second electronic device 204 are located outside the external electronic device 220 according to one embodiment.

Referring to FIG. 9A, in operations 902 and 904, the first electronic device 202 and the second electronic device 204 may determine that a connection therebetween is released based on link supervision timeout (LSTO). In an embodiment, LSTO may be used to determine that a connection is released if there is no mutual response between the first electronic device 202 and the second electronic device 204 for a preset time. For example, the connection between the first electronic device 202 and the second electronic device 204 may be released, if a distance between the first electronic device 202 and the second electronic device 204 is greater than or equal to a threshold value. If the connection between the first electronic device 202 and the second electronic device 204 is released, the first electronic device 202 and the second electronic device 204 may perform a page operation and a page scan operation for reconnection.

Since the first electronic device 202 and the second electronic device 204 are located outside the external electronic device 220, the page scan operation may be performed at a very low duty and the page operation may be intermittently performed in order to consume the minimum amount of current and resource. That is, the first electronic device 202 and the second electronic device 204 may perform a page scan operation and a page operation for a particular time duration shorter than a preset time at a particular time interval greater than a preset time interval.

For example, in operations 908, 916, and 924, the first electronic device 202 may perform a page scan operation using a duty lower than a generally used duty (e.g., 11.25 ms×2/1,280 ms). In addition, in operations 912, 920, and 928, the first electronic device 204 may perform a page operation at an interval greater than that of a generally performed page operation.

Similarly, in operations 906, 914, and 922, the second electronic device 204 may perform a page scan operation using a duty lower than a generally used duty (e.g., 11.25 ms×2/1,280 ms). In addition, in operations 910, 918, and 926, the second electronic device 204 may perform a page operation at an interval greater than that of a generally performed page operation.

Meanwhile, unlike the embodiment shown in FIG. 9A, one of the first electronic device 202 and the second electronic device 204 may perform a page operation, and the remaining one of the first electronic device 202 and the second electronic device 204 may perform a page scan operation. Alternatively, one of the first electronic device 202 and the second electronic device 204 may perform BLE advertising, and the remaining one of the first electronic device 202 and the second electronic device 204 may perform a BLE scan operation. Alternatively, both the first electronic device 202 and the second electronic device 204 may perform BLE advertising and a BLE scan operation according to a predefined duty. In the case of performing the BLE advertising and BLE scan operation, the first electronic device 202 or the second electronic device 204 may perform the BLE advertising at an interval greater than that of general BLE advertising, or perform the BLE scan operation for a duty lower than an existing duty.

According to an embodiment, one (e.g., the first electronic device 202) of the first electronic device 202 and the second electronic device 204 may be connected to the electronic device 101, and the remaining one (e.g., the second electronic device 204) of the first electronic device 202 and the second electronic device 204 may not be connected to the electronic device 101. In this case, a connection establishment operation shown in FIG. 9B may be performed.

Figure 9B:
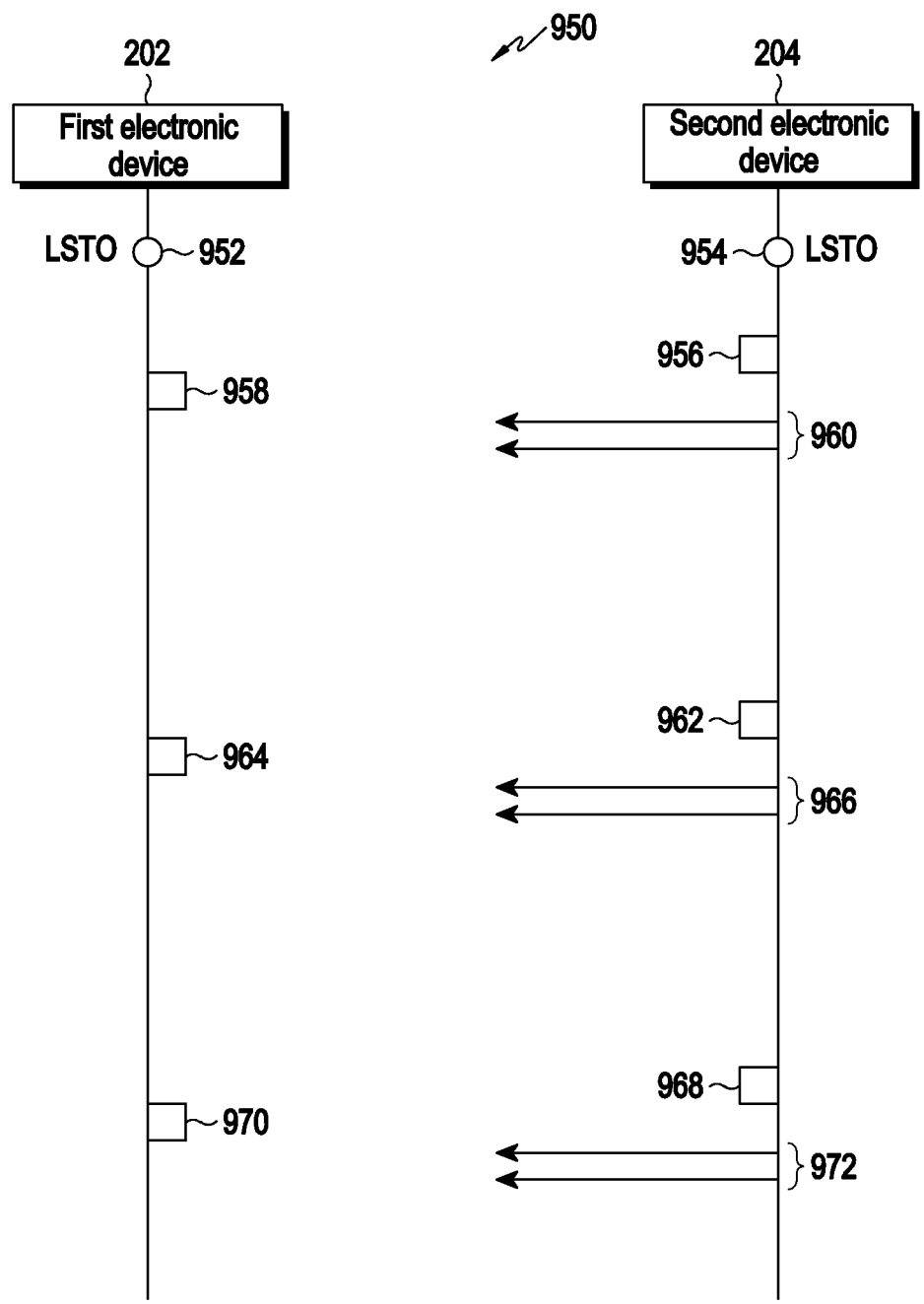
FIG. 9B is a signal flowchart illustrating another example of a connection establishment operation that may be performed in a state in which a first electronic device and a second electronic device are located outside an external electronic device according to one embodiment.

FIG. 9B is a signal flowchart 950 illustrating another example of a connection establishment operation that may be performed while the first electronic device 202 and the second electronic device 204 are located outside the external electronic device 220 according to one embodiment.

Referring to FIG. 9B, in operations 952 and 954, the first electronic device 202 and the second electronic device 204 may determine that the connection therebetween is released based on LSTO. If the connection between the first electronic device 202 and the second electronic device 204 is released, the first electronic device 202 and the second electronic device 204 may perform an operation for reconnection.

For example, the first electronic device 202 connected to the electronic device 101 (e.g., a smartphone) in FIG. 1 may perform a page scan operation, and the second electronic device 204 that is not connected to the electronic device 101 may perform a page operation and a page scan operation. Since the first electronic device 202 must also perform communication with the connected electronic device 101, a page operation for requesting a connection to the second electronic device 204 may not be performed.

Since the first electronic device 202 and the second electronic device 204 are located outside the external electronic device 220, a page scan operation may be performed at a very low duty and a page operation may be intermittently performed in order to consume the minimum amount of current and resource.

For example, in operations 968, 964, and 970, the first electronic device 202 may perform a page scan operation using a duty lower than a generally used duty (e.g., 11.25 ms×2/1,280 ms). The second electronic device 204 may perform a page scan operation using a duty lower than a generally used duty (e.g., 11.25 ms×2/1,280 ms) in operations 956, 962, and 968. In addition, in operations 960, 966, and 972, the second electronic device 204 may perform a page operation at an interval greater than that of a generally performed page operation.

Referring back to Table 6, in Case 3, that is, in the case where the first electronic device 202 and the second electronic device 204 are to attempt a connection while one of the first electronic device 202 and the second electronic device 204 is located outside the external electronic device 220 and while the remaining one of the first electronic device 202 and the second electronic device 204 is located inside the external electronic device 220, it may be necessary to consider current consumption and resources rather than fast connection. For example, in the case where the first electronic device 202 is located outside the external electronic device 220 and where the second electronic device 204 is located inside the external electronic device 220, the operation shown in FIG. 10 may be performed.

Figure 10:
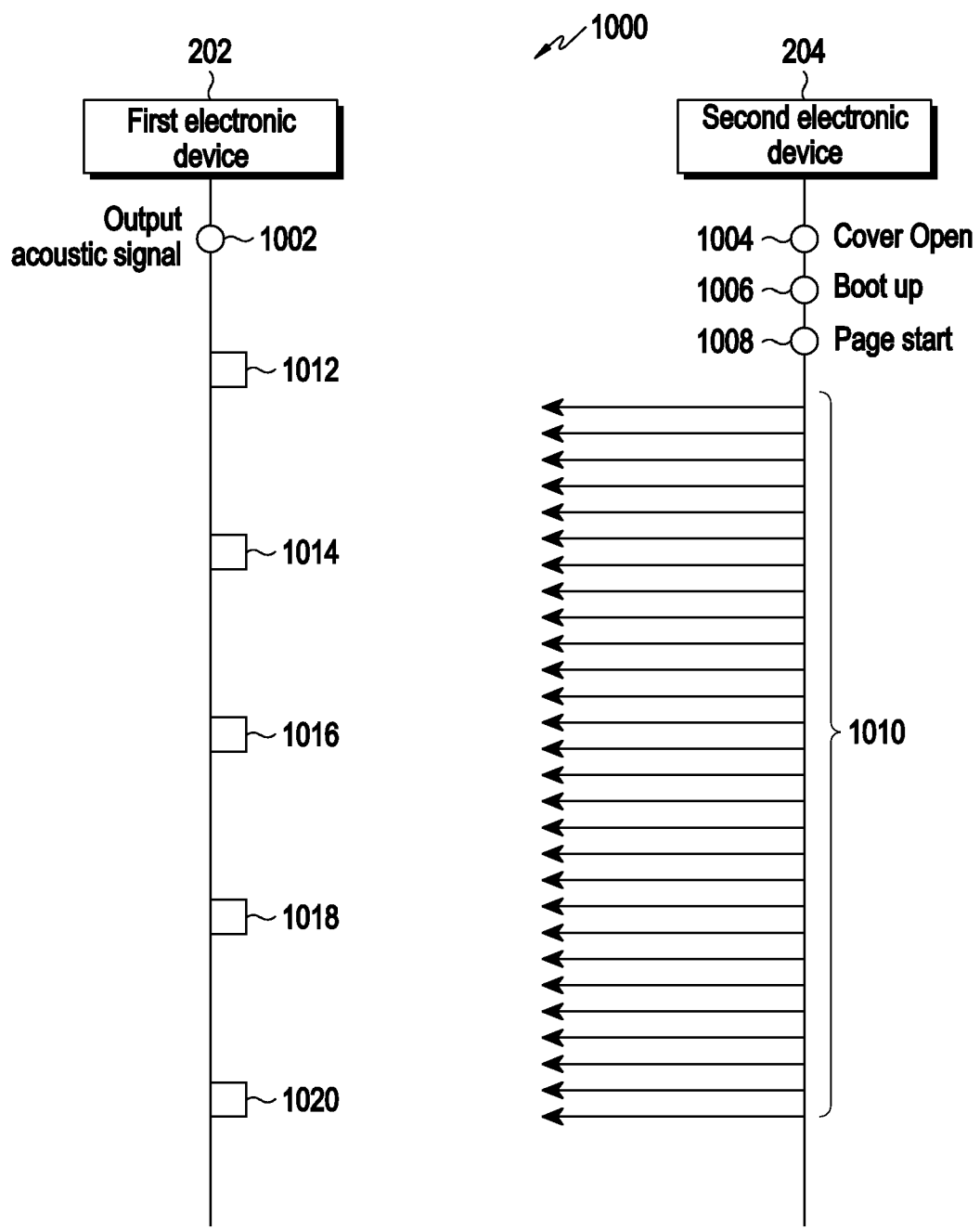
FIG. 10 is a signal flowchart illustrating a connection establishment operation that may be performed in a state in which a first electronic device is located outside an external electronic device and in which a second electronic device is located inside the external electronic device according to one embodiment.

FIG. 10 is a signal flowchart 1000 illustrating a connection establishment operation that may be performed while the first electronic device 202 is located outside the external electronic device 220 and while the second electronic device 204 is located inside the external electronic device 220 according to one embodiment.

Referring to FIG. 10, the first electronic device 202 may be located outside the external electronic device 220 and output an acoustic signal in operation 1002. In an embodiment, the acoustic signal may be an acoustic signal of audio data provided to the first electronic device 202 from the electronic device 101. The first electronic device 202 outside the external electronic device 220 may not output an acoustic signal, and in this case, the embodiment shown in FIG. 10 may be applied in the same manner.

The second electronic device 204 may be located inside the external electronic device 220, and identify that the cover 203 of the external electronic device 220 is in an open state in operation 1004. If it is identified that the cover 203 of the external electronic device 220 is in the open state, the second electronic device 204 may perform a booting operation in operation 1006. The second electronic device 204 may perform a Bluetooth function enablement operation and determine to initiate a page operation in operation 1008.

In an embodiment, if the first electronic device 202 is being used by the user, the first electronic device 202 is not aware of when the second electronic device 204 is to attempt a connection. Accordingly, the first electronic device 202 may periodically perform a page scan operation that consumes less resource than a page operation. On the other hand, when the booting operation and Bluetooth function enablement operations are completed, the second electronic device 204 may perform a page operation using the maximum amount of resource.

For example, the first electronic device 202 may perform a page scan operation in operations 1012, 1014, 1016, 1018, and 1020, and the page scan operation may be performed at a duty capable of maximally reducing the current consumption and resources. The duty capable of maximally reducing the current consumption and resources may be the same as a generally used duty (e.g., 11.25 ms×2/1,280 ms) or may be a lower duty (e.g., a duty 10% less than the generally used duty). The second electronic device 204 may use more resources than the first electronic device 202 because it has not yet performed a service, so the second electronic device 204 may perform a page operation using the maximum amount of resource (e.g., 100% resource) in operation 1010, as shown in Table 8.

TABLE 8

|  | Connection Operation Information | Page Scan Duty |
|---|---|---|
| First Electronic Device 202 | Page Scan | 11.25 ms × 2/320 ms |
| Second Electronic Device 204 | Page | 100% |

In an embodiment, the second electronic device 204 may perform a page operation for a preset time and, if the preset time elapses, perform a page scan operation together with the page operation. For example, if the first electronic device 202 is lost, the second electronic device 204 may need to receive a connection request from a third electronic device (e.g., the electronic device 101) such as a smartphone, so if a preset time elapses, the second electronic device 204 may perform a page scan operation together with the page operation. Similar to the embodiment shown in FIG. 10, one of the first electronic device 202 and the second electronic device 204, which is located outside the external electronic device 220, may perform a BLE scan operation with less resource, and the remaining one of the first electronic device 202 and the second electronic device 204, which is located inside the external electronic device 220, may perform BLE advertising with a high duty cycle at short intervals (e.g., 20 ms) using the maximum amount of resource.

In an embodiment, the first electronic device 202, which is used and located outside the external electronic device 220, may receive, from the external electronic device 220, information indicating that the second electronic device 204 is located inside the external electronic device 220 and that the cover 203 of the external electronic device 220 is in the closed state. In this case, the first electronic device 202 may completely cancel a pre-operation for a connection. Thereafter, if information indicating that the cover 203 is in the open state is received from the external electronic device 220, the first electronic device 202 may restart a pre-operation for a connection.

According to an embodiment, the first electronic device 202 and the second electronic device 204 may establish a communication link, based on the role information and parameter information described in the three cases above. The communication link may be established, for example, based on Bluetooth legacy or BLE communication technology.

Figure 11:
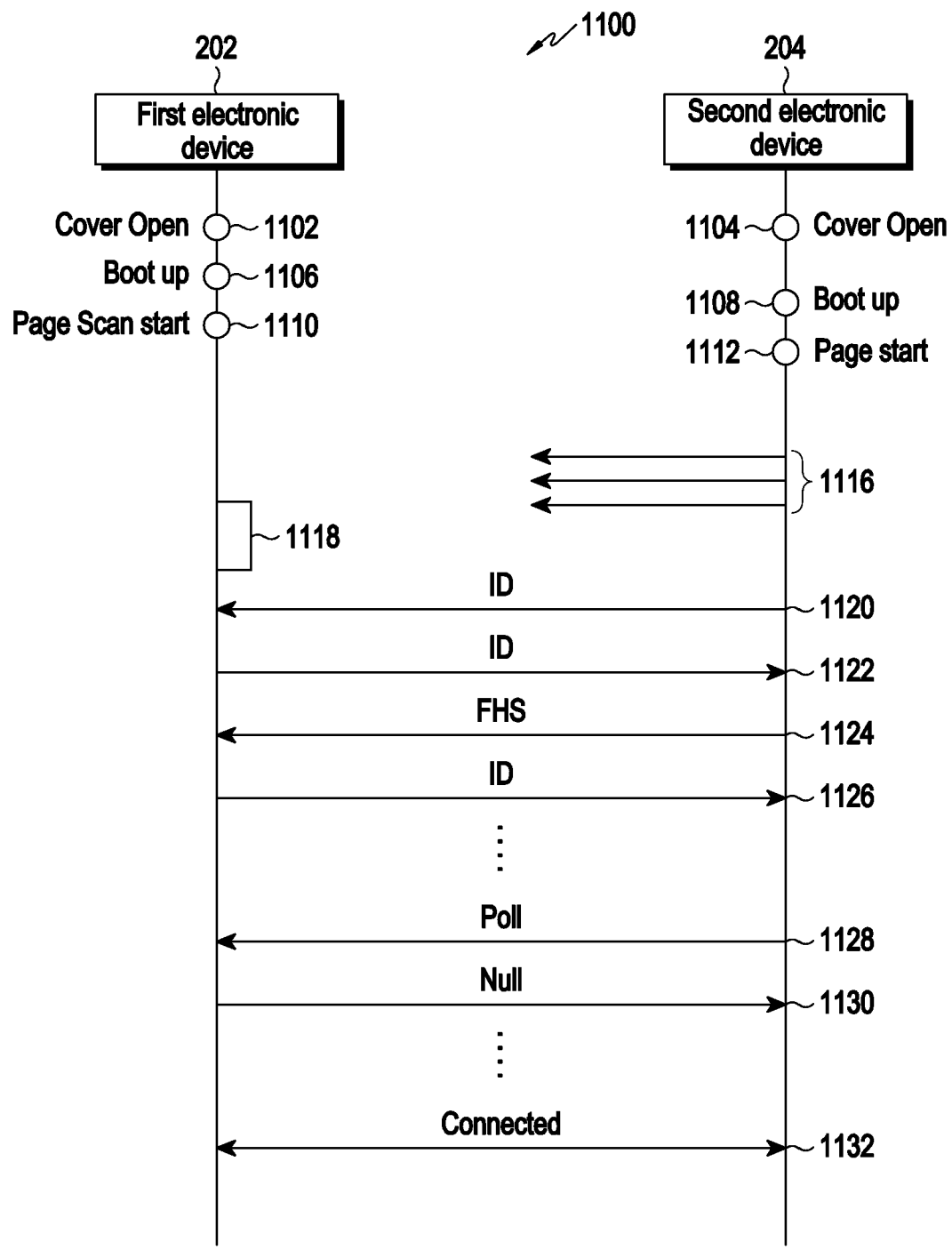
FIG. 11 is a signal flowchart illustrating an operation of establishing a communication link between a first electronic device and a second electronic device according to one embodiment.

FIG. 11 is a signal flowchart 1100 illustrating an operation of establishing a communication link between the first electronic device 202 and the second electronic device 204 according to one embodiment.

In the embodiment in FIG. 11, a communication link establishment operation that may be performed while the first electronic device 202 and the second electronic device 204 are located inside the external electronic device 220 are described by way of example.

Referring to FIG. 11, the first electronic device 202 and the second electronic device 204 may identify that the cover 203 of the external electronic device 220 is in the open state in operations 1102 and 1104, respectively. If it is identified that the cover 203 of the external electronic device 220 is in the open state, the first electronic device 202 and the second electronic device 204 may perform booting operations in operations 1106 and 1108, respectively. Additionally, the first electronic device 202 and the second electronic device 204 may perform a Bluetooth function enablement operation, respectively.

For quick connection between the first electronic device 202 and the second electronic device 204, one (e.g., the first electronic device 202) of the first electronic device 202 and the second electronic device 204 may determine to initiate a page scan operation in operation 1110, and the remaining one (e.g., the second electronic device 204) of the first electronic device 202 and the second electronic device 204 may determine to initiate a page operation in operation 1112.

In operation 1116, the second electronic device 204 may perform a page operation. The page operation of the second electronic device 204 may include a connection request operation of transmitting an ID packet. The ID packet may include a DAC determined based on the BD_ADDR of the first electronic device 202, and may be periodically transmitted in at least one channel among the configured number of channels.

After performing the page operation, the first electronic device 202 may perform a page scan operation in operation 1118. The page scan operation may include an operation in which the first electronic device 202 identifies, using its own BD_ADDR, whether or not there is a request for a connection with the first electronic device 202, that is, whether or not an ID packet is received. The page scan operation may include an operation in which the first electronic device 202 identifies whether or not an ID packet is received in at least one channel among the configured number of (e.g., 32) channels at a preset time interval (e.g., 1.28s).

The first electronic device 202 may receive an ID packet in at least one channel, based on the page scan operation in operation 1120. The first electronic device 202 may transmit the same response packet (ID packet) as the ID packet to the second electronic device 204 in at least one channel through which the ID packet is received in operation 1122.

If the response packet is received from the first electronic device 202, the second electronic device 204 may transmit a frequency hop synchronization (FHS) packet to the first electronic device 202 in operation 1124. The FHS packet may include, for example, a BD_ADDR and clock information of the second electronic device 204 and/or a logical transport (LT) address to be used by the first electronic device 202.

If the first electronic device 202 receives the FHS packet, the first electronic device 202 may notify that the FHS packet has been normally received by retransmitting a response packet (ID packet) to the second electronic device 204 in operation 1126. Thereafter, the first electronic device 202 and the second electronic device 204 may determine at least one channel among the configured number of channels using the BD_ADDR and clock information of the second electronic device 204 shared through the FHS packet.

In operation 1128, the second electronic device 204 may establish a baseband link, that is, a communication link, by transmitting a POLL packet to the first electronic device 202 in at least one determined channel. The POLL packet may be used in order for the second electronic device 204, operating as a master device, to poll the first electronic device 202 (e.g., instructing the first electronic device 202 to start transmission), operating as a slave device, in the connection procedure.

If the first electronic device 202 receives the POLL packet, it may have to respond even if there is no information to be transmitted. Accordingly, the first electronic device 202 may transmit a NULL packet in operation 1130. The NULL packet is a packet without a payload and may be used to return link information about success of previous transmission (e.g., transmission of a POLL packet).

In an embodiment, the POLL packet and the NULL packet may be transmitted/received through at least one determined channel, and if the transmission/reception of the POLL packet and the NULL packet is successful, the first electronic device 202 and the second electronic device 204 may be connected through an established communication link in operation 1132. The first electronic device 202 and the second electronic device 204 may exchange location information through the established communication link. An operation related thereto may be the same as illustrated in FIG. 12.

Figure 12:
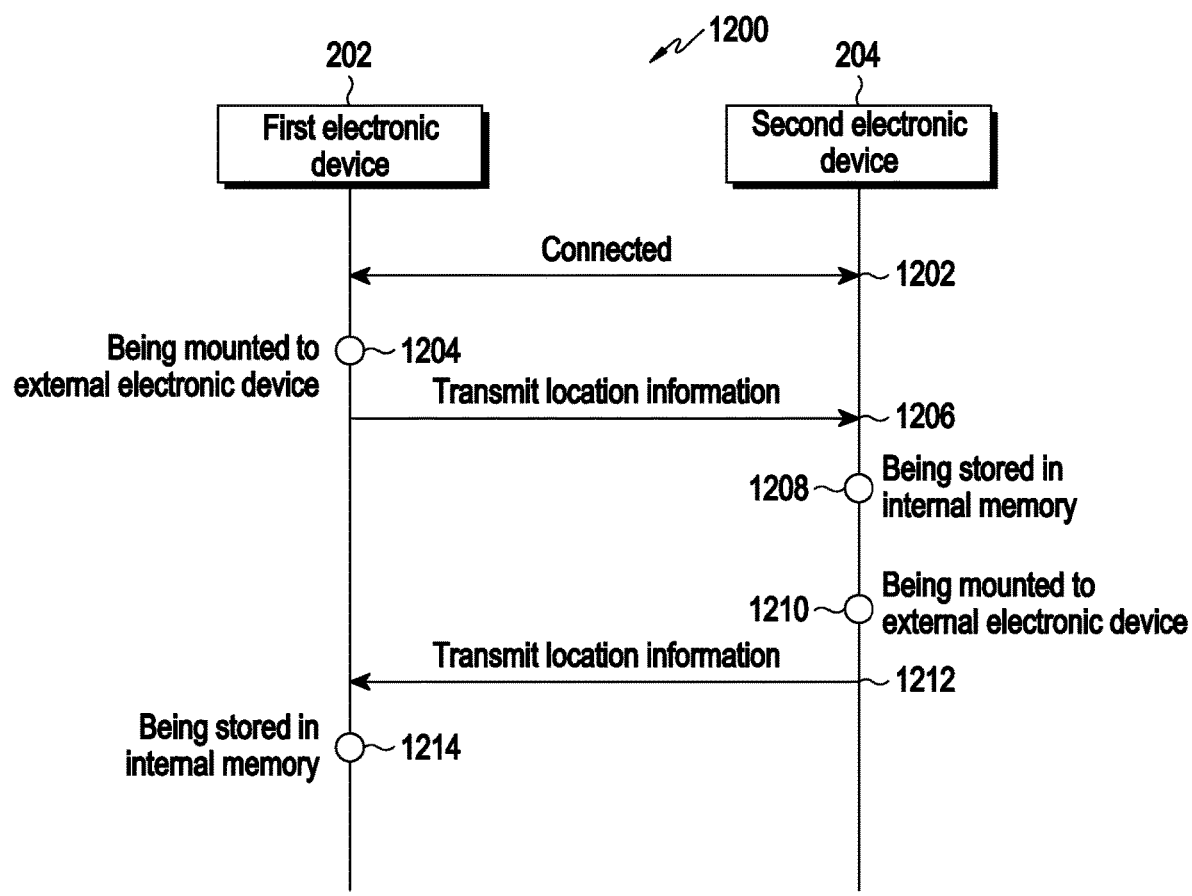
FIG. 12 is a signal flowchart illustrating an operation of exchanging location information between a first electronic device and a second electronic device according to one embodiment.

FIG. 12 is a signal flowchart 1200 illustrating an operation of exchanging location information between the first electronic device 202 and the second electronic device 204 according to one embodiment.

Referring to FIG. 12, in operation 1202, the first electronic device 202 and the second electronic device 204 may be connected through a communication link. Operation 1202 may be operation 1132 in FIG. 11, and operations subsequent to operation 1202 in FIG. 12 may be the operations performed after operation 1132 in FIG. 11.

In operation 1204, the first electronic device 202 may be mounted to the external electronic device 220 while maintaining the communication link with the second electronic device 204. In operation 1206, the first electronic device 202 may transmit location information to the second electronic device 204 at the time at which the first electronic device 202 is mounted to the external electronic device 220, within a preset time from the time at which the first electronic device 202 is mounted thereto, or at the time at which the cover 203 of the external electronic device 220 is closed after the first electronic device 202 is mounted thereto. In an embodiment, the location information, which may be transmitted to the second electronic device 204, may include information indicating that the first electronic device 202 is located inside the external electronic device 220. In operation 1208, the second electronic device 204 may store the location information of the first electronic device 202 transmitted in operation 1206 in an internal memory of the second electronic device 204.

In operation 1210, the second electronic device 204 may be mounted to the external electronic device 220. In operation 1212, the second electronic device 204 may transmit location information to the first electronic device 202 at the time at which the second electronic device 204 is mounted to the external electronic device 220, within a preset time from the time at which the second electronic device 204 is mounted thereto, or at the time at which the cover 203 of the external electronic device 220 is closed after the second electronic device 204 is mounted thereto. In an embodiment, the location information, which may be transmitted to the first electronic device 202, may include information indicating that the second electronic device 204 is located inside the external electronic device 220. In operation 1214, the first electronic device 202 may store the location information of the second electronic device 204 transmitted in operation 1212 in an internal memory (e.g., a nonvolatile memory) of the first electronic device 202.

According to an embodiment, the location information of the second electronic device 204 and the location information of the first electronic device 202, which are stored in the first electronic device 202 and the second electronic device 204, respectively, may be reused at the next connection time.

Figure 13:
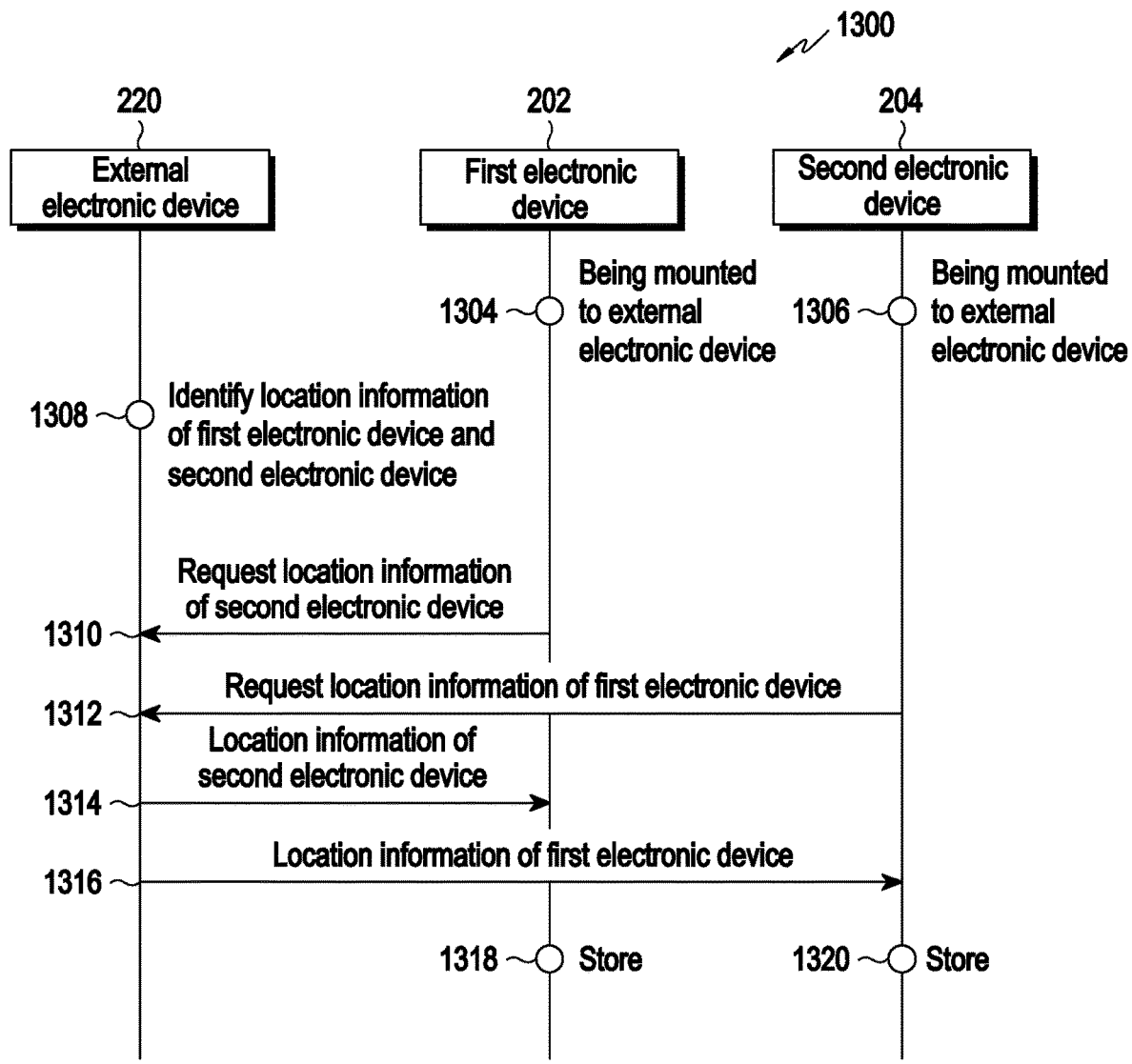
FIG. 13 is a signal flowchart illustrating an operation in which an external electronic device provides location information of a counterpart electronic device to a first electronic device and a second electronic device according to one embodiment.

FIG. 13 is a signal flowchart 1300 illustrating an operation in which the external electronic device 220 provides location information of a counterpart electronic device to the first electronic device 202 and the second electronic device 204 according to one embodiment.

Referring to FIG. 13, in operation 1304, the first electronic device 202 may be mounted to the external electronic device 220. In an embodiment, mounting of the first electronic device 202 to the external electronic device 220 may indicate that a charging port (e.g., the first charging port 206) of the first electronic device 202 comes into contact with a charging port (e.g., the third charging port 215 or the fourth charging port 217) of the external electronic device 220.

In operation 1306, the second electronic device 204 may be mounted to the external electronic device 220. In an embodiment, mounting of the second electronic device 204 to the external electronic device 220 may indicate that a charging port (e.g., the second charging port 208) of the second electronic device 204 comes into contact with a charging port (e.g., the third charging port 215 or the fourth charging port 217) of the external electronic device 220.

In operation 1308, the external electronic device 220 may identify location information of each of the first electronic device 202 and the second electronic device 204. In an embodiment, the external electronic device 220 identify location information indicating whether each of the first electronic device 202 and the second electronic device 204 is located inside or outside the external electronic device 220, based on whether or not the charging port (e.g., the first charging port 206) of the first electronic device 202 or the charging port (e.g., the second charging port 208) of the second electronic device 204 comes into contact with the charging port (e.g., the third charging port 215 or the fourth charging port 217) of the external electronic device 220.

According to an embodiment, a method for the external electronic device 220 to identify the location information of the first electronic device 202 and the second electronic device 204 may be variously modified. For example, the external electronic device 220 may identify the location information of each of the first electronic device 202 and the second electronic device 204 using at least one of sensor information, a wired communication scheme such as PLC communication, or a wireless communication scheme such as Bluetooth or BLE communication.

In operation 1310, the first electronic device 202 may request location information of the second electronic device 204 from the external electronic device 220. In operation 1312, the second electronic device 204 may request location information of the first electronic device 202 from the external electronic device 220. In an embodiment, the first electronic device 202 and/or the second electronic device 204 may request location information of a counterpart electronic device from the external electronic device 220 through PLC communication. The first electronic device 202 and/or the second electronic device 204 may request location information of the counterpart electronic device from the external electronic device 220 through Bluetooth or BLE communication, instead of PLC communication.

In operation 1314, the external electronic device 220 may transmit location information of the second electronic device 204 to the first electronic device 202, and in operation 1316, the external electronic device 220 may transmit location information of the first electronic device 202 to the second electronic device 204. For example, the external electronic device 220 may transmit location information to the first electronic device 202 and the second electronic device 204 through PLC communication. The external electronic device 220 may transmit location information to the first electronic device 202 and the second electronic device 204 through Bluetooth or BLE communication, instead of PLC communication.

In operation 1318, the first electronic device 202 may store the location information of the second electronic device 204 transmitted from the external electronic device 220 in its own memory (e.g., a volatile memory such as RAM). In operation 1320, the second electronic device 204 may store the location information of the first electronic device 202 transmitted from the external electronic device 220 in its own memory (e.g., a volatile memory such as RAM).

According to an embodiment, the location information stored in the volatile memories of the first electronic device 202 and the second electronic device 204 may be used for a connection between the first electronic device 202 and the second electronic device 204.

According to an embodiment, the location information stored in the volatile memories of the first electronic device 202 or the second electronic device 204 may be stored in the nonvolatile memory of the first electronic device 202 or the second electronic device 204 when the cover 203 of the external electronic device 220 is closed in the state in which the first electronic device 202 or the second electronic device 204 is mounted to the external electronic device 220.

In an embodiment, if the cover 203 of the external electronic device 220 is opened later and if a connection with a counterpart electronic device is required, the first electronic device 202 or the second electronic device 204 may use the location information of the counterpart electronic device stored in the nonvolatile memory.

Although the operation in which the first electronic device 202 and the second electronic device 204 receive the location information of the counterpart electronic device from the external electronic device 220 before power off has been described in the embodiment shown in FIG. 13, the disclosure is not limited thereto. For example, the first electronic device 202 and the second electronic device 204 may also exchange their location information after identifying that the cover 203 of the external electronic device 220 is in the closed state and before performing the Bluetooth function disablement operation.

Figure 14:
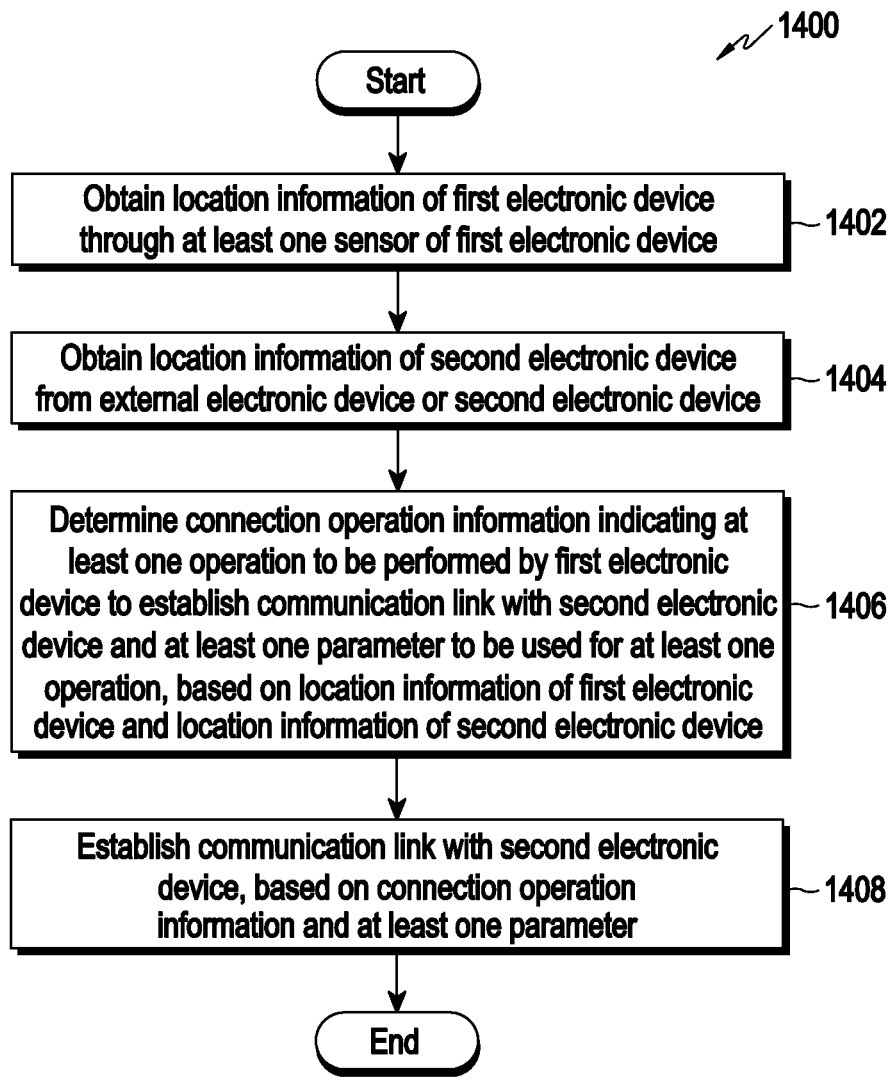
FIG. 14 is a flowchart illustrating the operation of a first electronic device according to one embodiment.

FIG. 14 is a flowchart illustrating the operation of a first electronic device according to one embodiment.

According to embodiments, the first electronic device may be one of the first electronic device 202 and the second electronic device 204, and the second electronic device may be the remaining one of the first electronic device 202 and the second electronic device 204. According to embodiments, the operations illustrated in FIG. 14 are not limited to the illustrated sequence and may be performed in various orders. According to embodiments, more or fewer operations than those illustrated in FIG. 14 or at least one of the operations may be performed.

Referring to FIG. 14, in operation 1402, the first electronic device may obtain location information of the first electronic device through at least one sensor 330 of the first electronic device.

In operation 1404, the first electronic device may obtain location information of the second electronic device from an external electronic device (e.g., the external electronic device 220) or the second electronic device.

In operation 1406, the first electronic device may determine connection operation information indicating at least one operation to be performed by the first electronic device to establish a communication link with the second electronic device and at least one parameter to be used for at least one operation, based on the location information of the first electronic device and the location information of the second electronic device.

In operation 1408, the first electronic device may establish a communication link with the second electronic device, based on the connection operation information and at least one parameter.

Figure 15:
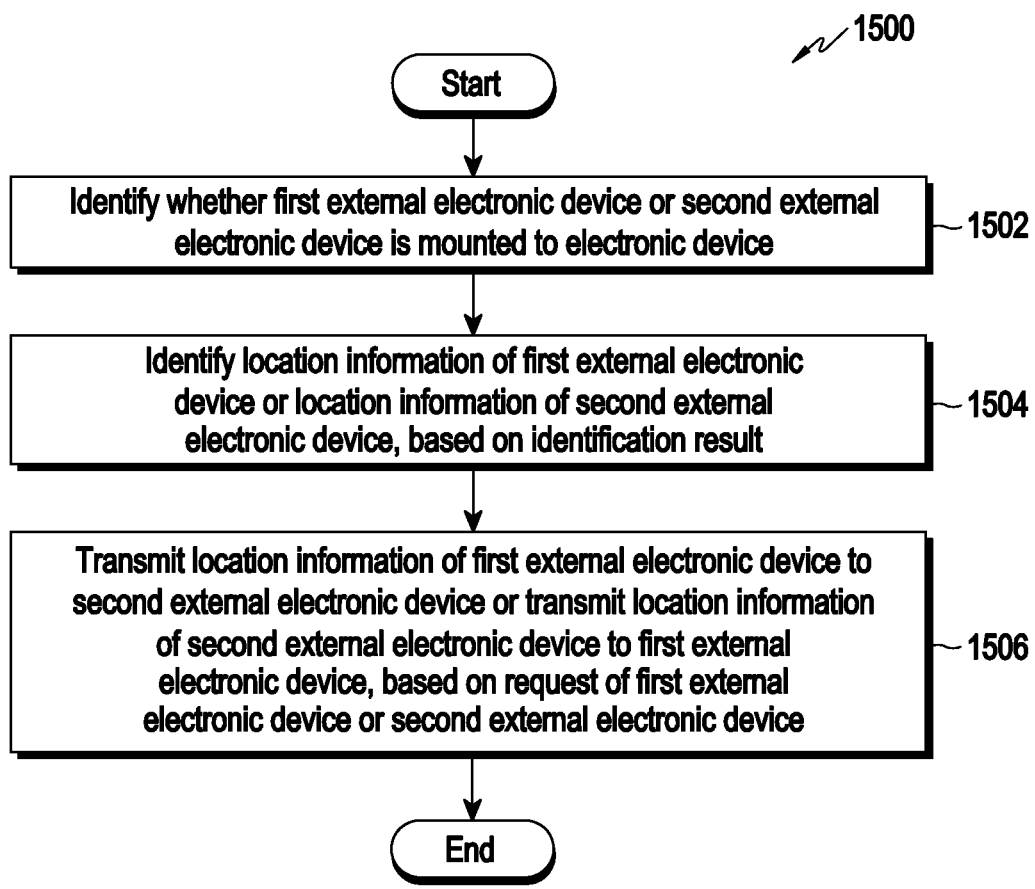
FIG. 15 is a flowchart illustrating the operation of an external electronic device according to one embodiment.

FIG. 15 is a flowchart illustrating the operation of an electronic device according to one embodiment.

According to embodiments, the electronic device may be the external electronic device 220. In addition, the first external electronic device may be one of the first electronic device 202 and the second electronic device 204, and the second external electronic device may be the remaining one of the first electronic device 202 and the second electronic device 204. According to embodiments, the operations illustrated in FIG. 15 are not limited to the illustrated sequence and may be performed in various orders. According to embodiments, more or fewer operations than those illustrated in FIG. 15 may be performed, or at least one of the operations may be performed.

Referring to FIG. 15, in operation 1502, the electronic device may identify whether a first external electronic device or a second external electronic device is mounted to the electronic device to obtain an identification result. In operation 1504, the electronic device may identify location information of the first external electronic device or location information of the second external electronic device, based on the identification result.

In operation 1506, based on a request of the first external electronic device or the second external electronic device, the electronic device may transmit the location information of the first external electronic device to the second external electronic device or transmit the location information of the second external electronic device to the first external electronic device.

According to an embodiment, the location information of the first external electronic device and the location information of the second external electronic device may be used to determine connection operation information indicating at least one operation to be performed by each of the first external electronic device and the second external electronic device to establish a communication link and at least one parameter to be used for at least one operation.

According to an embodiment, a method of establishing a connection by a first electronic device (e.g., the first electronic device 202) may include obtaining (1402) first location information of the first electronic device 202 through at least one sensor 330 of the first electronic device 202, obtaining (1404) second location information of a second electronic device 204 from an external electronic device (e.g., the external electronic device 220) or the second electronic device (e.g., the second electronic device 204), determining (1406), based on the first location information and the second location information, connection operation information indicating at least one operation to be performed by the first electronic device 202 to establish a communication link with the second electronic device 204 and at least one parameter to be used for the at least one operation, and establishing (1408) the communication link with the second electronic device 204, based on the connection operation information and the at least one parameter.

According to an embodiment, the first location information may include first information indicating whether the first electronic device 202 is located outside the external electronic device 220 or whether the first electronic device 202 is located inside the external electronic device 220. The second location information may include information indicating whether the second electronic device 204 is located outside the external electronic device 220 or whether the second electronic device 204 is located inside the external electronic device 220.

According to an embodiment, the obtaining of the second location information may include obtaining the second location information from the external electronic device 220 based on the first electronic device 202 being located inside the external electronic device 220, and obtaining the second location information from the second electronic device 204 based on the first electronic device 202 being located outside the external electronic device 220.

According to an embodiment, the determining of the connection operation information and the at least one parameter may include determining the connection operation information and the at least one parameter based on an open state or a closed state of a cover 203 of the external electronic device 220, the first location information, and the second location information of the second electronic device 204. The open state or the closed state of the cover 203 of the external electronic device may be identified by a first sensor included in the at least one sensor 330, or obtained from the external electronic device 220.

According to an embodiment, the determining of the connection operation information and the at least one parameter may include, based on a need to reconnect to the second electronic device 204, due to a disconnection of the first electronic device 202 from the second electronic device 204 at a location outside of the external electronic device 220, and the first electronic device 202 being connected to a third electronic device, determining the at least one operation indicated by the connection operation information to indicate a page scan operation or a page operation and determining the at least one parameter to indicate performing the at least one operation for a particular time duration at a particular time interval, the particular time duration being shorter than a preset time, and the particular time interval being greater than a preset time interval.

According to an embodiment, the determining of the connection operation information and the at least one parameter may include, based on a need to reconnect to the second electronic device 204, due to a disconnection of the first electronic device 202 from the second electronic device 204 at a location outside of the external electronic device 220, and the first electronic device 202 and the second electronic device 204 being not connected to a third electronic device, determining the at least one operation indicated by the connection operation information to indicate at least one of a page scan operation and a page operation and determining the at least one parameter to indicate performing the at least one operation for a particular time duration at a particular time interval, the particular time duration being shorter than a preset time, and the particular time interval being greater than a preset time interval.

According to an embodiment, the determining of the connection operation information and the at least one parameter may include, based on the cover 203 of the external electronic device being in an open state and the first electronic device and the second electronic device being at a location inside of the external electronic device 220, determining the at least one operation indicated by the connection operation information to indicate a page operation or a page scan operation and determining the at least one parameter to indicate performing the at least one operation for a particular time duration at a particular time interval, the particular time duration being longer than a preset time, and the particular time interval less being than a preset time interval.

According to an embodiment, the determining of the connection operation information and the at least one parameter may include, based on the cover 203 of the external electronic device being in an open state, the first electronic device being at a first location inside of the external electronic device 220, and the second electronic device being at a second location outside of the external electronic device 220, determining the at least one operation indicated by the connection operation information to indicate a page operation and determining the at least one parameter to indicate performing the at least one operation for a particular time duration at a particular time interval, the particular time duration being longer than a preset time, and the particular time interval being less than a preset time interval.

According to an embodiment, the determining of the connection operation information and the at least one parameter may include, based on the cover 203 of the external electronic device being in an open state, the first electronic device being at a first location outside of the external electronic device 220, and the second electronic device being at a second location inside of the external electronic device 220, determining the at least one operation indicated by the connection operation information to indicate a page scan operation and determining the at least one parameter to indicate performing the at least one operation for a particular time duration at a particular time interval, the particular time duration being shorter than a preset time, and the particular time interval being greater than a preset time interval.

According to an embodiment, a method for establishing a connection by an electronic device 220 may include identifying (1502) whether a first external electronic device 202 or a second external electronic device 204 is mounted to the electronic device 220 to obtain an identification result. The method may further include identifying (1504) first location information of the first external electronic device 202 or second location information of the second external electronic device 204, based on the identification result. The method may further include transmitting (1506) the second location information to the first external electronic device 202 based on a first request from the first external electronic device 202. The method may further include transmitting (1506) the first location information to the second external electronic device 204, based on a second request from the second external electronic device 204. The first location information and the second location information may be configured to be used to determine connection operation information indicating at least one operation to be performed by each of first external electronic device 202 and the second external electronic device 204 to establish a communication link and at least one parameter to be used for the at least one operation.

The electronic device according to various embodiments disclosed in the present disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or relocations for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A first electronic device comprising:
at least one sensor;
a first communication interface configured to perform communication with an external electronic device, wherein the external electronic device is at least one of a cradle or a charging case;
a second communication interface configured to perform communication with a second electronic device, wherein the first electronic device and the second electronic device are a pair of earbuds;
at least one processor operably connected to the at least one sensor, the first communication interface, and the second communication interface; and
memory storing instructions,
wherein the instructions, when executed by the at least one processor individually or collectively, cause the first electronic device to:
obtain first location information of the first electronic device through the at least one sensor, wherein the first location information indicates whether the first electronic device is located inside the external electronic device,
obtain second location information of the second electronic device from the external electronic device or the second electronic device, wherein the second location information indicates whether the second electronic device is located inside the external electronic device,
based on the first location information and the second location information, determine connection operation information indicating at least one operation to be performed by the first electronic device to establish a communication link with the second electronic device and at least one parameter to be used for the at least one operation, and
establish the communication link with the second electronic device, based on the connection operation information and the at least one parameter.

2. The first electronic device of claim 1, wherein the instructions, when executed by the at least one processor individually or collectively, further cause the first electronic device to:
obtain the second location information from the external electronic device, based on identifying that the first electronic device is mounted to the external electronic device, and
store the second location information in the memory.

3. The first electronic device of claim 1, wherein the instructions, when executed by the at least one processor individually or collectively, further cause the first electronic device to:
obtain the first location information and the second location information based on identifying that a state of a cover of the external electronic device is an open state, wherein the state of the cover of the external electronic device is identified by a first sensor included in the at least one sensor, or obtained from the external electronic device.

4. The first electronic device of claim 1, wherein the instructions, when executed by the at least one processor individually or collectively, further cause the first electronic device to:
based on a need to reconnect to the second electronic device due to a disconnection from the second electronic device at a location outside of the external electronic device, and the first electronic device being connected to a third electronic device, determine the at least one operation indicated by the connection operation information to indicate at least one of a page scan operation, a page operation, a Bluetooth low energy (BLE) advertising operation, or a BLE scan operation, and
determine the at least one parameter indicated by the connection operation information to indicate performing the at least one operation for a particular time duration at a particular time interval, the particular time duration being shorter than a preset time, and the particular time interval being greater than a preset time interval.

5. The first electronic device of claim 1, wherein the instructions, when executed by the at least one processor individually or collectively, further cause the first electronic device to:
based on a need to reconnect to the second electronic device due to a disconnection from the second electronic device at a location outside of the external electronic device, and the first electronic device and the second electronic device being not connected to a third electronic device, determine the at least one operation indicated by the connection operation information to indicate at least one of a page scan operation, a page operation, a Bluetooth low energy (BLE) advertising operation, or a BLE scan operation, and
determine the at least one parameter indicated by the connection operation information to indicate performing the at least one operation for a particular time duration at a particular time interval, the particular time duration being shorter than a preset time, and the particular time interval being greater than a preset time interval.

6. The first electronic device of claim 1, wherein the instructions, when executed by the at least one processor individually or collectively, further cause the first electronic device to:
based on a state of a cover of the external electronic device being an open state, the first electronic device being at a first location outside of the external electronic device, and the second electronic device being at a second location inside of the external electronic device, determine the at least one operation indicated by the connection operation information to indicate a page scan operation, and determine the at least one parameter indicated by the connection operation information to indicate performing the at least one operation for a particular time duration at a particular time interval, the particular time duration being shorter than a preset time, and the particular time interval being greater than a preset time interval.

7. An electronic device comprising:
at least one sensor;
a communication interface configured to perform communication with a first external electronic device and a second external electronic device, wherein the first external electronic device and the second external electronic device are a pair of earbuds;
at least one processor operably connected to the at least one sensor and the communication interface; and
memory storing instructions, wherein the electronic device is at least one of a cradle or a charging case, wherein the instructions, when executed by the at least one processor individually or collectively, cause the electronic device to:

identify whether at least one of the first external electronic device or the second external electronic device is mounted to the electronic device through the at least one sensor to obtain an identification result, identify first location information of the first external electronic device and second location information of the second external electronic device, based on the identification result, wherein the first location information indicates whether the first external electronic device is located inside the electronic device, and wherein the second location information indicates whether the second external electronic device is located inside the electronic device, transmit the second location information to the first external electronic device, based on identifying that the first external electronic device is mounted to the electronic device, and transmit the first location information to the second external electronic device, based on identifying that the second external electronic device is mounted to the electronic device, and wherein the first location information and the second location information are used to determine connection operation information indicating at least one operation to be performed by at least one of the first external electronic device or the second external electronic device to establish a communication link between the first external electronic device and the second external electronic device and at least one parameter to be used for the at least one operation.

8. A method of establishing a connection by a first electronic device, the method comprising:

obtaining first location information of the first electronic device through at least one sensor of the first electronic device, wherein the first location information indicates whether the first electronic device is located inside an external electronic device;

obtaining second location information of a second electronic device from the external electronic device or the second electronic device, wherein the second location information indicates whether the first electronic device is located inside the external electronic device, wherein the first electronic device and the second electronic device are a pair of earbuds, and wherein the external electronic device is at least one of a cradle or a charging case;

based on the first location information and the second location information, determining connection operation information indicating at least one operation to be performed by the first electronic device to establish a communication link with the second electronic device and at least one parameter to be used for the at least one operation; and establishing the communication link with the second electronic device, based on the connection operation information and the at least one parameter.

9. The method of claim 8, wherein the first location information and the second location information are obtained based on identifying that a state of a cover of the external electronic device is an open state, and wherein the state of the cover of the external electronic device is identified by a first sensor included in the at least one sensor, or obtained from the external electronic device.

10. The method of claim 8, wherein the determining of the connection operation information and the at least one parameter comprises:

based on a need to reconnect to the second electronic device due to a disconnection from the second electronic device at a location outside of the external electronic device, and the first electronic device being connected to a third electronic device, determining the at least one operation indicated by the connection operation information to indicate at least one of a page scan operation, a page operation, a Bluetooth low energy (BLE) advertising operation, or a BLE scan operation; and determining the at least one parameter to indicate performing the at least one operation for a particular time duration at a particular time interval, the particular time duration being shorter than a preset time, and the particular time interval being greater than a preset time interval.

11. The method of claim 8, wherein the determining of the connection operation information and the at least one parameter comprises:

based on a need to reconnect to the second electronic device due to a disconnection from the second electronic device at a location outside of the external electronic device, and the first electronic device and the second electronic device being not connected to a third electronic device, determining the at least one operation indicated by the connection operation information to indicate at least one of a page scan operation, a page operation, a Bluetooth low energy (BLE) advertising operation, or a BLE scan operation; and determining the at least one parameter to indicate performing the at least one operation for a particular time duration at a particular time interval, the particular time duration being shorter than a preset time, and the particular time interval being greater than a preset time interval.

12. A method for establishing a connection by an electronic device, wherein the electronic device is at least one of a cradle or a charging case, the method comprising:

identifying whether at least one of a first external electronic device or a second external electronic device is mounted to the electronic device to obtain an identification result, wherein the first external electronic device and the second external electronic device are a pair of earbuds;

identifying first location information of the first external electronic device and second location information of the second external electronic device, based on the identification result, wherein the first location information indicates whether the first external electronic device is located inside the electronic device, and wherein the second location information indicates whether the second external electronic device is located inside the electronic device;

transmitting the second location information to the first external electronic device, based on a first request from the first external electronic device; and transmitting the first location information to the second external electronic device, based on a second request from the second external electronic device, wherein the first location information and the second location information are used to determine connection operation information indicating at least one operation to be performed by at least one of the first external electronic device or the second external electronic device to establish a communication link between the first external electronic device and the second external electronic device and at least one parameter to be used for the at least one operation.

13. The method of claim 12, wherein the obtaining identifying of the second location information comprises:
obtaining the second location information from the first external electronic device based on the first external electronic device being located inside the electronic device; and
obtaining the second location information from the second external electronic device based on the first external electronic device being located outside the electronic device.

14. The method of claim 8, wherein the determining of the connection operation information and the at least one parameter comprises:
based on a state of a cover of the external electronic device being an open state, and the first electronic device and the second electronic device being at a location inside of the external electronic device;
determining the at least one operation indicated by the connection operation information to indicate at least one of a page operation, a page scan operation, a Bluetooth low energy (BLE) advertising operation, or a BLE scan operation; and
determining the at least one parameter to indicate performing the at least one operation for a particular time duration at a particular time interval, the particular time duration being longer than a preset time, and the particular time interval being less than a preset time interval.

15. The method of claim 8, wherein the determining of the connection operation information and the at least one parameter comprises:
based on a state of a cover of the external electronic device being an open state, the first electronic device being at a first location inside of the external electronic device, and the second electronic device being at a second location outside of the external electronic device;
determining the at least one operation indicated by the connection operation information to indicate a page operation; and
determining the at least one parameter to indicate performing the at least one operation for a particular time duration at a particular time interval, the particular time duration being longer than a preset time, and the particular time interval being less than a preset time interval.

16. The method of claim 8, wherein the determining of the connection operation information and the at least one parameter comprises:
based on a state of a cover of the external electronic device being an open state, the first electronic device being at a first location outside of the external electronic device, and the second electronic device being at a second location inside of the external electronic device,
determining the at least one operation indicated by the connection operation information to indicate a page scan operation, and determining the at least one parameter performing the at least one operation for a particular time duration at a particular time interval, the particular time duration being shorter than a preset time, and the particular time interval being greater than a preset time interval.

17. The first electronic device of claim 1, wherein the at least one operation comprises at least one of a page scan operation, a page operation, a Bluetooth low energy (BLE) advertising operation, or a BLE scan operation, and
wherein the at least one parameter indicates at least one of an interval or a duration for use in performing the at least one operation.

18. The first electronic device of claim 1, wherein the instructions, when executed by the at least one processor individually or collectively, further cause the first electronic device to:
based on identifying that a state of a cover of the external electronic device is an open state while both of the first electronic device and the second electronic device are located inside the external electronic device, perform a first page scan operation at a first page scan time interval for a first time period in which the second electronic device is performing a first page operation,
based on the first electronic device failing to connect to the second electronic device for the first time period, perform a second page operation and a second page scan operation at a second page scan time interval for a second time period in which the second electronic device is performing the first page operation and a third page scan operation at a third page scan time interval,
wherein the first page scan time interval is shorter than the second page scan time interval and the third page scan time interval, and
wherein the third page scan time interval is different from the second page scan time interval.

19. The first electronic device of claim 1, wherein the instructions, when executed by the at least one processor individually or collectively, further cause the first electronic device to:
based on identifying that the state of a cover of the external electronic device is an open state while the first electronic device is located inside the external electronic device and the second electronic device is located outside the external electronic device, perform a first page operation for a first time period, and
based on the first electronic device failing to connect to the second electronic device for the first time period, perform the first page operation and a first page scan operation at a first page scan time interval for a second time period in which the second electronic device is performing a second page operation and a second page scan operation at a second page scan time interval,
wherein the second page scan time interval is different from the first page scan time interval.

20. The method of claim 8, wherein the at least one operation comprises at least one of a page scan operation, a page operation, a Bluetooth low energy (BLE) advertising operation, or a BLE scan operation, and
wherein the at least one parameter indicates at least one of an interval or a duration for use in performing the at least one operation.

\* \* \* \* \*